US011868331B1

(12) United States Patent
Riddle et al.

(10) Patent No.: US 11,868,331 B1
(45) Date of Patent: Jan. 9, 2024

(54) SYSTEMS AND METHODS FOR ALIGNING BIG DATA TABLES IN LINEAR TIME

(71) Applicant: Pattern Computer, Inc., Friday Harbor, WA (US)

(72) Inventors: Michael Riddle, Cave Creek, AZ (US); Michael Dushkoff, Colden, NY (US)

(*) Notice: Subject to any disclaimer, the term of this patent is extended or adjusted under 35 U.S.C. 154(b) by 0 days.

(21) Appl. No.: 16/417,976

(22) Filed: May 21, 2019

Related U.S. Application Data

(60) Provisional application No. 62/674,328, filed on May 21, 2018.

(51) Int. Cl.
*G06F 16/22* (2019.01)
*G06F 16/23* (2019.01)

(52) U.S. Cl.
CPC ...... *G06F 16/2282* (2019.01); *G06F 16/2246* (2019.01); *G06F 16/2365* (2019.01); *G06F 16/2379* (2019.01)

(58) Field of Classification Search
CPC .......... G06F 16/2282; G06F 16/2379; G06F 16/2246; G06F 16/2365
See application file for complete search history.

(56) References Cited

U.S. PATENT DOCUMENTS

| | | |
|---|---|---|
| 5,121,494 A | 6/1992 | Dias et al. |
| 5,241,648 A | 8/1993 | Cheng et al. |
| 5,899,997 A | 5/1999 | Ellacott |
| 6,263,331 B1 | 6/2001 | Liu et al. |
| 6,505,188 B1 | 1/2003 | Ghazal et al. |
| 7,386,565 B1 | 6/2008 | Singh et al. |
| 8,352,458 B2 | 1/2013 | Aggarwal |
| 2007/0168640 A1* | 7/2007 | Hrle .................. G06F 16/24557 711/206 |
| 2008/0059492 A1* | 3/2008 | Tarin ..................... G06F 16/221 |
| 2010/0281013 A1* | 11/2010 | Graefe ................ G06F 16/2246 707/715 |
| 2014/0172905 A1* | 6/2014 | Konik ................. G06F 16/2455 707/769 |
| 2014/0324875 A1* | 10/2014 | Gudeman ........... G06F 16/2272 707/741 |
| 2015/0089574 A1* | 3/2015 | Mattsson ............ G06F 21/6254 726/1 |

(Continued)

FOREIGN PATENT DOCUMENTS

WO    WO 2001059602 A1    8/2001

OTHER PUBLICATIONS

Mishra et al. (1992) "Join Processing in Relational Databases," ACM Computing Surveys, vol. 24, No. 1, pp. 63-113.

(Continued)

*Primary Examiner* — Richard L Bowen
*Assistant Examiner* — Aryan D Toughiry
(74) *Attorney, Agent, or Firm* — Cozen O'Connor

(57) ABSTRACT

First and second big data tables may be aligned into compacted and reordered tables, respectively, such that each row of the compacted table and the corresponding similarly-indexed row of the reordered table have equal keys. Advantageously, the time complexity of alignment scales linearly with the number of rows of the data tables, and the compacted and reordered tables may be subsequently joined by parsing once through the tables. Alignment may be extended to three or more big data tables.

18 Claims, 16 Drawing Sheets

(56) References Cited

U.S. PATENT DOCUMENTS

| | | | | |
|---|---|---|---|---|
| 2016/0224602 | A1* | 8/2016 | Petculescu | G06F 16/2365 |
| 2016/0357795 | A1* | 12/2016 | Sundstrom | G06F 16/22 |
| 2018/0096072 | A1* | 4/2018 | He | G06F 40/205 |
| 2018/0349374 | A1* | 12/2018 | Gurajada | G06F 3/0653 |
| 2019/0147087 | A1* | 5/2019 | Mart | G06F 16/24544 |
| | | | | 707/713 |
| 2019/0311059 | A1* | 10/2019 | Bakulina | G06F 16/2282 |

OTHER PUBLICATIONS

Valduriez (1987) "Join Indices," ACM Transactions on Database Systems, vol. 12, No. 2, pp. 218-246.

* cited by examiner

| | (1) | (2) | (3) |
|---|---|---|---|
| (1) | 65 | | |
| (2) | 77 | | |
| (3) | 46 | | |
| (4) | 17 | | |
| (5) | 75 | | |
| (6) | 88 | | |
| (7) | 56 | | |
| (8) | 20 | | |
| (9) | 18 | | |
| (10) | 24 | | |
| (n) | | | |

1508

1500(2)

| | (1) | (2) | (3) |
|---|---|---|---|
| (1) | -1 | -1 | |
| (2) | 77 | 5 | |
| (3) | -1 | -1 | |
| (4) | 17 | 8 | |
| (5) | -1 | -1 | |
| (6) | 88 | 3 | |
| (7) | -1 | -1 | |
| (8) | -1 | -1 | |
| (9) | 18 | 1 | |
| (10) | 24 | 10 | |

1500(3)

| | (1) | (2) | (3) |
|---|---|---|---|
| (1) | -1 | -1 | -1 |
| (2) | -1 | -1 | -1 |
| (3) | -1 | -1 | -1 |
| (4) | 17 | 8 | 6 |
| (5) | -1 | -1 | -1 |
| (6) | 88 | 3 | 7 |
| (7) | -1 | -1 | -1 |
| (8) | -1 | -1 | -1 |
| (9) | 18 | 1 | 3 |
| (10) | -1 | -1 | -1 |

SYSTEMS AND METHODS FOR ALIGNING BIG DATA TABLES IN LINEAR TIME

RELATED APPLICATIONS

This application claims priority to U.S. Provisional Patent Application No. 62/674,328, filed May 21, 2018, which is incorporated herein by reference in its entirety.

BACKGROUND

The proliferation of low-cost sensors and information-sensing devices, combined with steep drops in the cost of storing data, has led to the generation of data sets so large that traditional techniques for managing, analyzing, storing, and processing these data sets are challenged. Data sets meeting this criterion, referred to in the art as "big data," arise in many fields, including genomics, meteorology, high-energy physics, predictive analytics, and business informatics. Whether a data set is "big" or not depends less on its numerical size, and more on whether the quantity is so large that it requires new approaches to data management. For some fields, a big data set may mean a few terabytes; for other fields, such as particle accelerators and internet search engines, "big" could mean exabytes.

SUMMARY OF THE EMBODIMENTS

Certain big-data analysis techniques, such as cluster analysis, operate on a data set that is usually stored as a single data table. When the data set is initially stored in multiple tables, the tables must be joined into the single table prior to the subsequent analysis. Prior-art join techniques, such as nested loop joins and sort-and-merge joins, have been developed for relational database systems to join two tables. However, these prior-art techniques have a time complexity that is greater than linear (e.g., polynomial) in the size of the data tables. As a result, for big data tables having billions of rows, or more, these join techniques are so slow that they can only be implemented on specialized computing systems developed specifically for big-data operations.

Described herein is a linear table joiner that combines two or more big data tables with a time complexity that scales linearly with data table size (i.e., number of rows). Because of this linear scaling, the linear table joiner advantageously joins data tables faster than prior-art join techniques that have a greater-than-linear scaling. Accordingly, the linear table joiner provides significant time savings over these prior-art techniques. For example, a prior-art join operation that would require weeks of computing time to complete can be completed by the linear table joiner in a few hours, or less.

In addition to improved speed, the linear table joiner can also advantageously join substantially larger data tables than prior-art join techniques are capable of processing, and thus can be used to join big data tables on computing systems with limited resources (i.e., processor speed). Accordingly, the linear table joiner enables the joining of big data tables using only non-specialized computing systems, as opposed to specialized computing systems and databases previously required. However, the linear table joiner may also be used with specialized big-data systems and databases to improve speed and to increase the size of data tables they can join, thereby enhancing their functionality.

In one embodiment, a method for aligning first and second data tables, the first data table having a plurality of indexable first-table rows identifiable by a corresponding plurality of unique first-table keys, the second data table having a plurality of indexable second-table rows identifiable by a corresponding plurality of unique second-table keys, includes generating a key search tree for the second-table keys. The method also includes constructing, using the key search tree, a row-index array that is indexed identically to the first-table rows and includes a plurality of matched elements corresponding to a plurality of matched first-table rows. Each of the matched elements stores a second-table row position that locates in the second data table a matched second-table row having the second-table key that equals the first-table key of the corresponding matched first-table row. The method also includes compacting, using the row-index array, the first data table into a compacted first data table having a plurality of compacted first-table rows that equal the matched first-table rows. The method also includes reordering, using the row-index array, the second data table into a reordered second data table having a plurality of reordered second-table rows that equal the matched second-table rows, the reordered second-table rows being ordered so that the first-table key of each compacted first-table row equals the second-table key of the corresponding reordered second-table row. Advantageously, a time complexity of the method scales linearly with a number of the first-table rows.

In another embodiment, a system for aligning data tables includes a secondary storage configured to store first and second data tables, the first data table having a plurality of indexable first-table rows identifiable by a corresponding plurality of unique first-table keys, the second data table having a plurality of indexable second-table rows identifiable by a corresponding plurality of unique second-table keys. The system also includes a processor and a table-aligning engine, implemented as machine-readable instructions stored in a memory in electronic communication with the processor, that, when executed by the processor, controls the system to generate a key search tree for the second-table keys. The table-aligning engine further controls the system to construct, using the key search tree, a row-index array that is indexed identically to the first-table rows and includes a plurality of matched elements corresponding to a plurality of matched first-table rows. Each of the matched elements stores a second-table row position that locates in the second data table a matched second-table row having the second-table key that equals the first-table key of the corresponding matched first-table row. The table-aligning engine further controls the system to compact, using the row-index array, the first data table into a compacted first data table having a plurality of compacted first-table rows that equal the matched first-table rows. The table-aligning engine further controls the system reorder, using the row-index array, the second data table into a reordered second data table having a plurality of reordered second-table rows that equal the matched second-table rows, the reordered second-table rows being ordered so that the first-table key of each compacted first-table row equals the second-table key of the corresponding reordered second-table row. Advantageously, a time complexity of the table-aligning engine scales linearly with a number of the first-table rows.

BRIEF DESCRIPTION OF THE FIGURES

FIG. 15 shows construction of a row-index table for aligning the first big data table of FIG. 1, the second big data table of FIG. 1, and the third big data table of FIG. 12 by compacting and/or reordering each of the first, second, and third big data tables only once, in an embodiment.

DETAILED DESCRIPTION OF THE EMBODIMENTS

Figure 1:
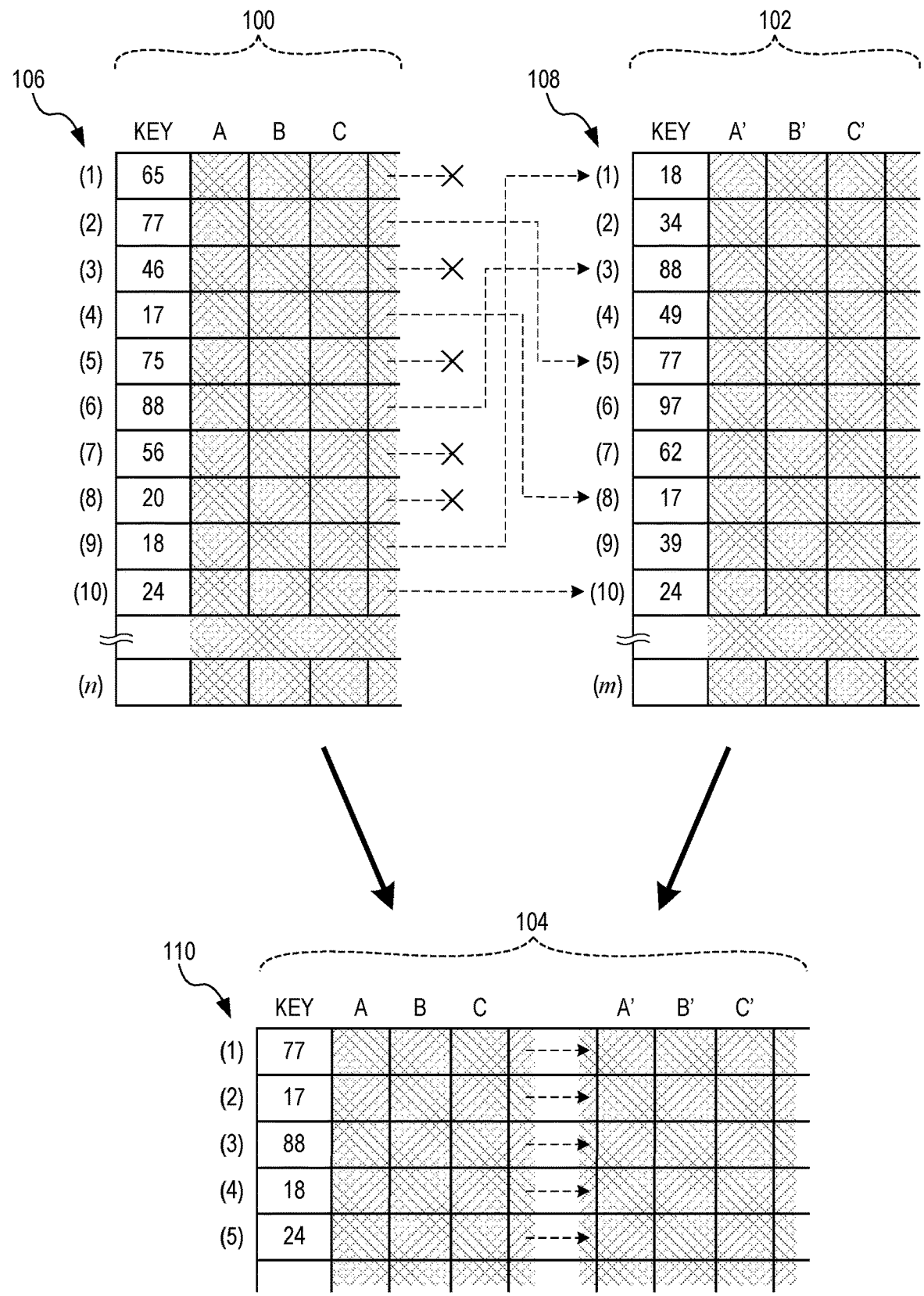
FIG. 1 shows a first big data table and a second big data table being aligned to simplify joining into a join table, in embodiments.

As an example of how the linear table joiner may be used for big data analytics, consider a first table storing the results of a genomics study, the rows corresponding to patients who were subjects in the study and the columns corresponding to different value for gene expressions. A second table may store a different set of results related to those in the first table, such as a second set of gene expressions for a different set of patients. However, some of the patients may be the same in both tables. There may be no a priori way of knowing which patients have entries in both tables. Furthermore, the order of the patients may be different in the two tables.

Certain analyses, such as identifying correlations across all gene expressions, may require data spanning the two tables. To perform such an analysis, the tables may first be "aligned," meaning that they are parsed to identify only those patients with entries in both tables. Alignment also means that data from patients appearing in only one of the two tables is ignored or discarded, and that the rows of one of the tables are reordered so that the patients are listed in the same row (i.e., having the same index) in both tables. To use terminology commonly used in the art, data associated with a patient is called a "data point" and the set of tables forms a "data set". Each of the multiple values making up a data point is called a "measurement," the measurements for each data point being spread across multiple tables. Therefore, table alignment consists of: (1) identifying data points for which measurements exist across all the tables, (2) reordering the rows of at least one table so that all measurements for a single data point occur in the same row in all tables, and (3) removing rows for data points that do not have measurements in every table.

The linear table joiner aligns two data tables in linear time by combining four steps that cooperate to generate a compacted table and a reordered table that are aligned, i.e., each row of the compacted table has an identifying key that matches an identifying key of the similarly-positioned row (i.e., having the same index) of the reordered table. Thus, the first row of the compacted table and the first row of the reordered table have the same key, the second row of the compacted table and the second row of the reordered table have the same key, and so on. Advantageously, the compacted and reordered tables may be joined in linear time by sequentially concatenating each row of the compacted table with its corresponding similarly-positioned row of the reordered table.

The linear table joiner aligns first and second big data tables by: (1) generating a key-search tree for the second big data table, (2) constructing a row-index array by searching the key-search tree, (3) compacting the rows of the first big data table, with the row-index array, into a compacted first data table, and (4) reordering the rows of the second big data table, with the row-index array, into a reordered second data table. As described in more detail below, the steps of compacting and reordering scale linearly with table size. On the other hand, the steps of generating and constructing have a slightly greater-than-linear scaling. However, one aspect of the embodiments is the realization that the steps of generating a key-search tree and constructing a row-index array are both faster than reordering and compacting because these steps do not require the time- and memory-intensive steps of moving rows in memory, either between or within tables. As a result, when the four steps are considered as a whole, the overall scaling of the combined steps is linear, even for extremely large data tables.

Data sets may be stored as "flat files" that have no explicit indexing or structural relationship between records. A flat file may be a plain text file or binary file in which a series of data records is stored sequentially. The records may have an identical structure, such as the same number of values. Records stored in flat files may use commas, tabs, white space, or other characters to indicate the end of one value and the beginning of the next value. Some flat files contain one record per line with an end-of-line delimiter indicating the end of the record; other delimiters may be used to indicate the end of a record.

Data stored in a flat file may be represented as a table, similar to a table used to represent a relation in a relational database. In this case, each row of the table may correspond to a record in the flat file (called a tuple in a relational database), and each cell of the table may correspond to a single value in the flat file (called a field in a relational database). All of the first values of the rows are grouped into a first column of the table (called an attribute in a relational database); all the second values are grouped into a second column of the table, and so on. As such, the number of columns in the table equals the number of values within each record, assuming the records all have the same number of values.

Big data sets may be stored across multiple flat files having a different number of records (e.g. number of rows) and a different number of values for each record (e.g. number of columns). Records may be identified by keys, for example to identify tuples across different relations in a relational database. The keys may be stored as one or more values within each record at one or more fixed positions within the sequence of values, and similarly as one or more columns within a table. For example, the first value of each record may contain a key used to identify the record; the first values of all records in a fixed file form a key column in the corresponding table.

Big data sets stored across multiple flat files may be combined for subsequent analysis. For example, two flat files may be joined into a join table by first converting each of the flat files into an input table. Various matching criteria may be used to ensure that only certain rows from each input table are outputted to the join table. For example, rows between the input tables may be matched only if their keys match.

In a relational database, tuples in a relation form a mathematical set that contains no predetermined order. In fact, the order in which the tuples of a relation are stored in the conventional relational database, either on disk or in memory, is arbitrary and may even change as users of the database insert and delete tuples to the relation. For this reason, candidate keys, primary keys, and superkeys may be used to uniquely identify individual tuples within a relation.

In the present disclosure, on the other hand, the rows of a table have an order that is implicitly defined, and therefore form a mathematical sequence, not a set. The position of a row within the sequence uniquely determines the row. Although row number may serve as a primary key, foreign keys are still used for linking rows between tables. In conventional databases, where such ordering does not exist or is not guaranteed, tuples may only be retrieved using sequential access, which is significantly slower than direct access. Accordingly, the linear table joiner described herein advantageously retrieves data faster than prior-art join processes designed and implemented specifically for relational databases.

As described in more detail below, the terms "table," "row," and "column" in the following discussion have different meanings than their conventional use in relational databases, the most important being that a table referred to hereinbelow is an ordered sequence of rows and columns, and therefore forms an indexable collection of rows. Equivalently, a table may be considered an array of rows, each having a unique index associated with it. In conventional relational databases, rows, columns, and tables have no indexing or ordering.

FIG. 1 shows a first big data table 100 and a second big data table 102 being aligned to simplify joining into a join table 104. First big data table 100 has n first-table rows and a plurality of columns, and second big data table 102 has m second-table rows and a plurality of columns. Each big data table 100, 102 may be formed from data stored in one or more flat files. First-table row positions 106 index the first-table rows with integer values between 1 and n, thereby establishing an order of the first-table rows. Similarly, second-table row positions 108 index the second-table rows with integer values between 1 and m, thereby establishing an order of the second-table rows. For clarity, only the first ten rows of each data table 100, 102 are shown in FIG. 1. However, it should be appreciated that each data table 100, 102 may contain any number of rows, including millions of rows, or more. In addition, row positions 106, 108 need not be stored as values within respective data tables 100, 102, as the position of a row may be inferred from its location within a table.

First and second big data tables 100, 102 may have different numbers of rows (i.e., m and n are not equal) and/or different numbers of columns. For clarity, only the first four columns of each data table 100, 102 are shown in FIG. 1. Specifically, first data table 100 is shown with three data columns, labeled A, B, and C, that contain measurements, and second data table 102 is shown with three data columns, labeled A', B' and C', that contain measurements different from the measurements in first data table 100. However, each big data table 100, 102 may contain any number of data columns, including millions of data columns, or more.

Each first-table row may be identified by a first-table key stored in a KEY column of first big data table 100. Similarly, each second-table row may be identified by a second-table key stored in a KEY column of second big data table 102. As indicated by the dashed arrows in FIG. 1, some first-table rows have a first-table key that equals the second-table key of a second-table row; each of these first-table rows may be referred to herein as a "matched first-table row", and each of these second-table rows may be referred to herein as a "matched second-table row". In the example of FIG. 1, first-table rows 2, 4, 6, 9, and 10 match second-table rows 5, 8, 3, 1, and 10, respectively (having keys 77, 17, 88, 18, and 24, respectively). Therefore, first-table rows 2, 4, 6, 9, and 10 are matched first-table rows, and second-table rows 5, 8, 3, 1, and 10 are matched second-table rows.

Some first-table rows have a first-table key different from all the second-table keys, and some second-table rows have a second-table key different from all the first-table keys. Each of these rows having an unmatched key may be referred to herein as an "unmatched row." In the example of FIG. 1, first-table rows 1, 3, 5, 7, and 8 are unmatched first-table rows, and second-table rows 2, 4, 6, 7, and 9 are unmatched second-table rows.

It is assumed herein that a key appears at most once in a data table. That is, the first-table keys form a unique set of values, and the second-table keys form a unique set of values. Therefore, first and second data tables 100 and 102 form at most a 1:1 relationship. When first and second data tables 100, 102 contain at least one unmatched row, first and second data tables 100, 102 form a (zero-or-one)-to-(zero-or-one) relationship.

Join table 104 is also a big data table having a plurality of join-table rows and a plurality of columns. Join-table row positions 110 index the join-table rows with integer values starting at 1, thereby establishing an order of the join-table rows. Join table 104 only contains matched first-table rows and matched second-table rows. In the example of FIG. 1, join table 104 contains five join-table rows with keys 77, 17, 88, 18, and 24. These five join-table rows may be formed by concatenating each matched first-table row (e.g. first-table rows 2, 4, 6, 9, and 10) with the associated matched second-table row (e.g., second-table rows 5, 8, 3, 1, and 10). Join table 104 is shown in FIG. 1 having five join-table rows, equal to the number of matched first-table rows and the number of matched second-table rows. However, join table 104 may contain at most a number of join-table rows equal to the smaller of n and m.

Figure 2:
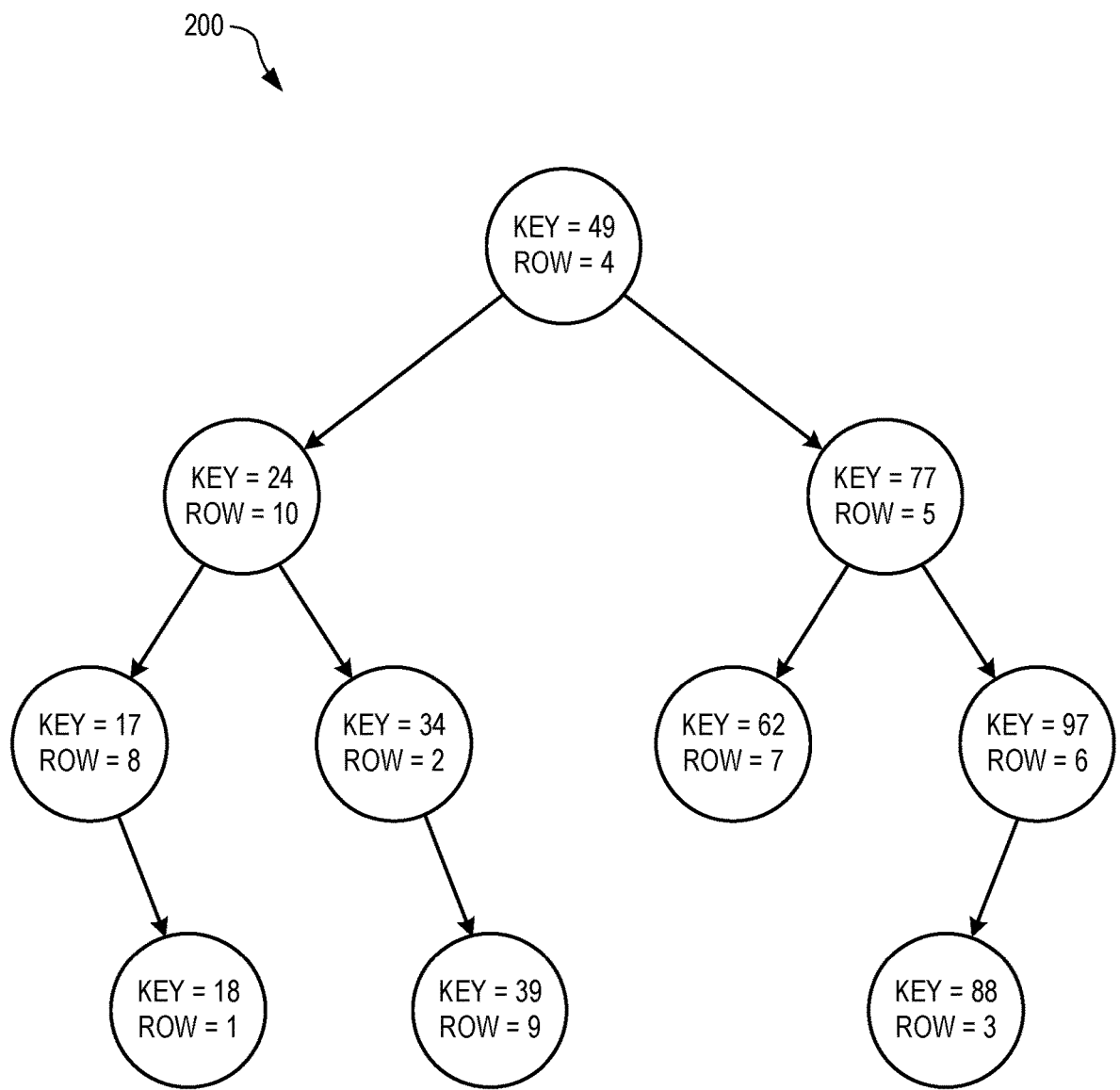
FIG. 2 shows one example of a key search tree used to align the first and second big data tables of FIG. 1, in an embodiment.

FIG. 2 shows one example of a key search tree 200 used to align first and second big data tables 100, 102. Key search tree 200 has a plurality of nodes, each storing one second-table key and the associated second-table row position 108 of the second-table row having the one second-table key. Key search tree 200 contains one node for each second-table row so that a number of nodes of key search tree 200 equals the number of second-table rows m. In the example of FIG. 2, key search tree 200 has ten nodes corresponding to the ten second-table rows shown in FIG. 1. Since a key may only appear once in a data table, each second-table row position 108 of second data table 102 appears once in key search tree 200. While key search tree 200 is shown in FIG. 2 as a balanced binary search tree, another type of tree may be used without departing from the scope hereof (e.g., B-tree, red-black tree, self-balancing tree). In other embodiments, a non-tree-based data structure is used to search the second-table keys, such as a hash table or another search algorithm known in the art.

Figure 3:
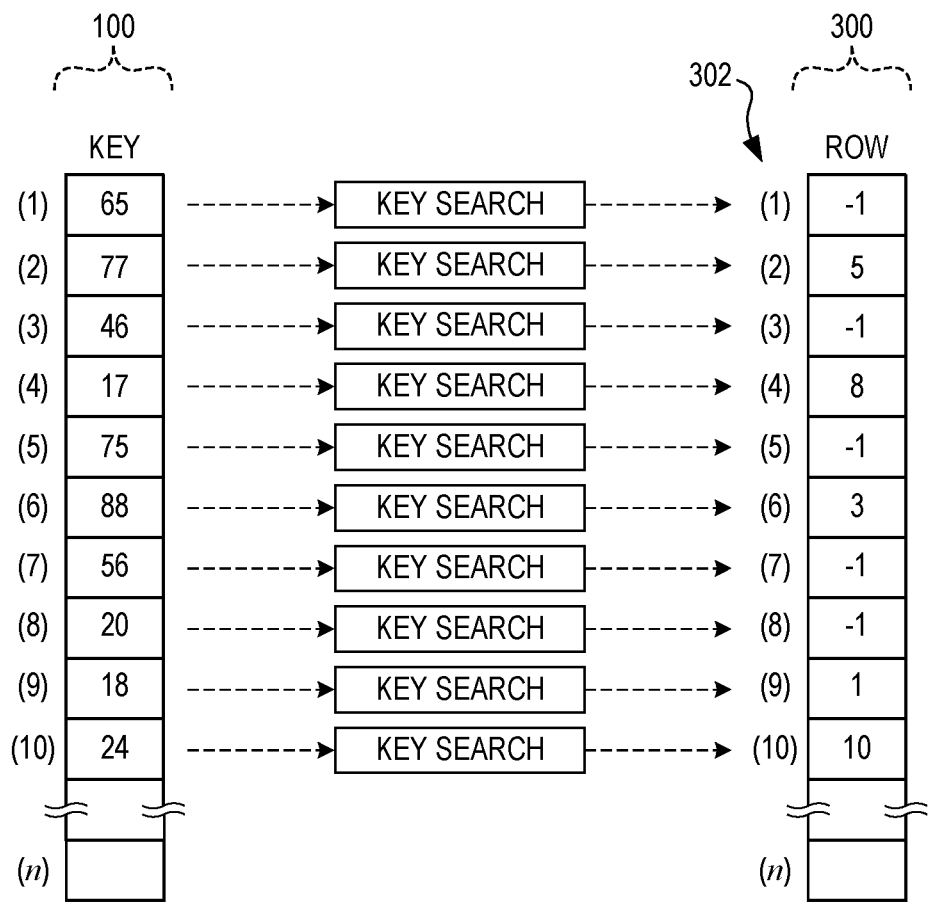
FIG. 3 shows the key search tree of FIG. 2 being used with the first big data table of FIG. 1 to construct a row-index array, in an embodiment.

FIG. 3 shows key search tree 200 of FIG. 2 being used with first big data table 100 to construct a row-index array 300. Row-index array 300 is a one-dimensional array of n elements, i.e., a length of row-index array 300 equals the number of first-table rows. That is, the row-index array 300 is indexed identically to the first big data table 100. Indices 302 index the elements of row-index array 300 with integer values between 1 and n. For clarity in FIG. 3, only the KEY column of first data table 100 is shown. For each first-table row, key search tree 200 is searched for the corresponding first-table key. If a matching node is found in key search tree 200, the second-table row position 108 stored in the matching node is copied to the corresponding element of row-index array 300. In this case, the corresponding element of row-index array 300 is a "matched element". If a matching node is not found, a null value is stored in the corresponding element of row-index array 300. In this case, the corresponding element of row-index array 300 is an "unmatched element". The null value is −1, although the term "null value" as used herein may be any other value that is not equal to any of second-table row positions 108.

In one embodiment, key search tree 200 is deallocated from memory after row-index array 300 is constructed, advantageously freeing up memory. In another embodiment, each matching node of key search tree 200 is removed from key search tree 200 when found, advantageously speeding up subsequent searching of key search tree 200 by reducing the number of nodes to be subsequently searched. When a matching node of key search tree 200 is removed, key search tree 200 may be rebalanced to minimize the search time of key search tree 200.

Figure 4:
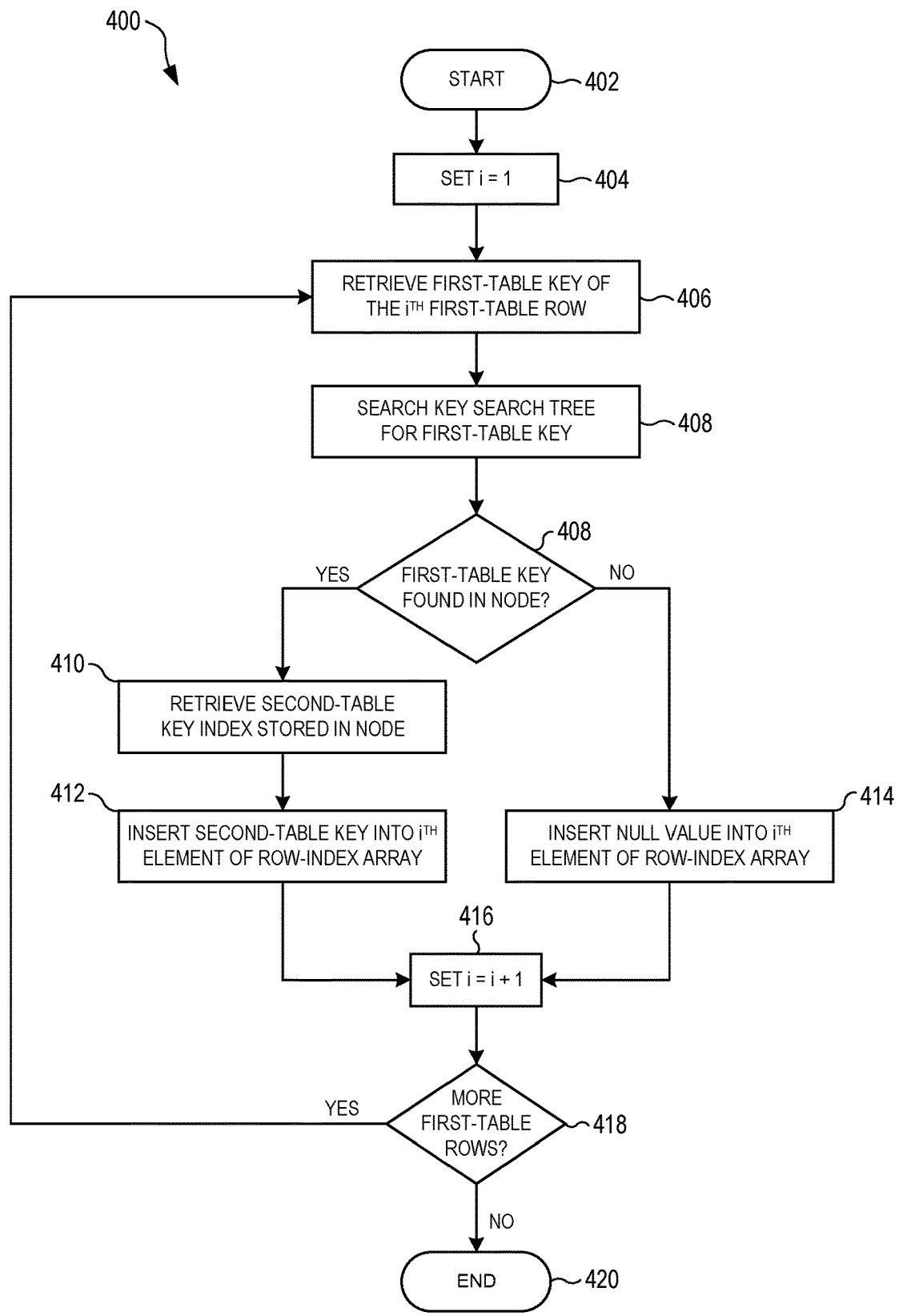
FIG. 4 is a flow chart illustrating a method for constructing a row-index array with a first data table and a key search tree generated from a second data table, in embodiments.

FIG. 4 is a flow chart illustrating a method 400 for constructing a row-index array with a first data table and a key search tree generated from a second data table, in an embodiment. The first data table has a plurality of indexable first-table rows identifiable by a corresponding plurality of unique first-table keys, and the second data table has a plurality of indexable second-table rows identifiable by a corresponding plurality of unique second-table keys. As shown in FIG. 3, method 400 may be used to construct row-index array 300 with first big data table 100 and key search tree 200 generated from second big data table 102. As shown in FIG. 4, method 400 may be implemented as a loop with an index variable i that iterates sequentially over n row positions of the first data table (e.g., see row positions 106 in FIG. 1). The row-index array has n elements corresponding to the n row positions of the first data table. That is, the row-index array is indexed identically to the first-table rows.

Method 400 starts at a step 402. In a step 404, the index variable i is set to 1, corresponding to an initial first-table row position of the first data table (e.g., first-table row position 106(1) in FIG. 1). In a step 406, a first-table key is retrieved from the first-table row located at first-table row position i. A decision step 408 determines if the first-table key was found in a node of the key search tree. If decision step 408 returns YES, method 400 continues with a step 410 in which a second-table row position is retrieved from the node of the key search tree. In a step 412, the second-table row position retrieved at step 410 is inserted into the $i^{th}$ element of the row-index array, wherein the $i^{th}$ element is a matched element. If decision step 408 returns NO, method 400 continues to a step 414 in which a null value is inserted into the $i^{th}$ element of the row-index array, wherein the $i^{th}$ element is an unmatched element.

After step 412 or 414, method 400 continues with a step 416 in which the index variable i is increased by one. A decision step 418 determines if there are more first-table rows to be processed. For example, decision step 418 may compare the value of i, as updated in step 416, to the number of first-table rows n. If decision step 418 returns YES, (e.g., i≤n), method 400 goes back to step 406 and repeats steps 406-416 with the updated value of i. If decision step 418 returns NO (e.g., i>n), method 400 ends at a step 420.

In an embodiment, a method for constructing a row-index array includes a first step of iteratively searching a key search tree for a first-table key of each of a plurality of indexable first-table rows forming a first data table. In one example of the first step, step 408 of method 400 is iteratively executed once for each first-table row of first big data table 100. The method also includes a second step of: when the first-table key of said each first-table row is found in a node of the key search tree, inserting, into an element of the row-index array corresponding to said each first-table row, a second-table row position stored in the node. Steps 410 and 412 of method 400 are one example of the second step. The method also includes a third step of: when the first-table key of said each first-table row is not found in the key search tree, inserting a null value into the element of the row-index array. Step 414 of method 400 is one example of the third step.

Figure 5:
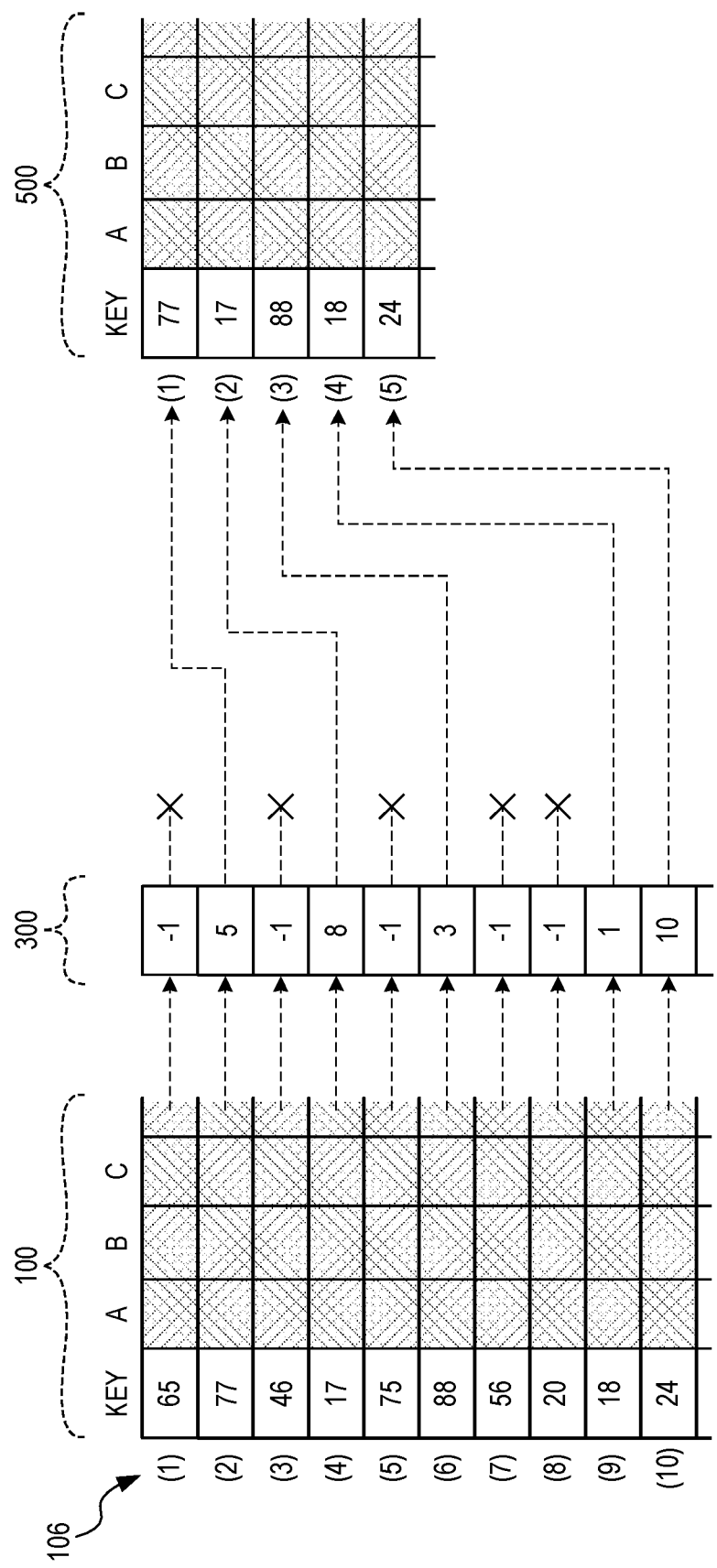
FIG. 5 shows the row-index array of FIG. 3 being used to compact the first big data table of FIG. 1 into a compacted first data table, in an embodiment.

FIG. 5 shows row-index array 300 being used to compact first data table 100 into a compacted first data table 500. Compacted first data table 500 only includes matched first-table rows of first data table 100. Compacted first data table 500 may be created by appending each matched first-table row to compacted first data table 500. In the example of FIG. 5, row 1 of first data table 100 (with key 65) is an unmatched first-table row, as indicated by the null value −1 in the first element of row-index array 300. First-table row 1 is therefore ignored and/or discarded. First-table row 2 (with key 77) is a matched first-table row, as indicated a value other than the null value in the second element of row-index array 300. First-table row 2 may be appended to compacted first data table 500 by copying or moving first-table row 2 to row 1 of compacted first data table 500. As shown in FIG. 5, when the first-table rows are sequentially accessed according to row positions 106, matched first-table rows may be appended to compacted first data table 500, thereby maintaining an order of the matched first-table rows.

FIG. 5 thus demonstrates a method for compacting a first data table into a compacted first data table. The first data table has a plurality of indexable first-table rows identifiable by a corresponding plurality of unique first-table keys. The method includes a first step of retaining a plurality of matched first-table rows, each having a first-table key equal to a second-table key of one matched second-table row of a second data table. The method also includes a second step of discarding a remaining plurality of unmatched first-table rows. The method also includes a third step of maintaining an order of the matched first-table rows.

Figure 6:
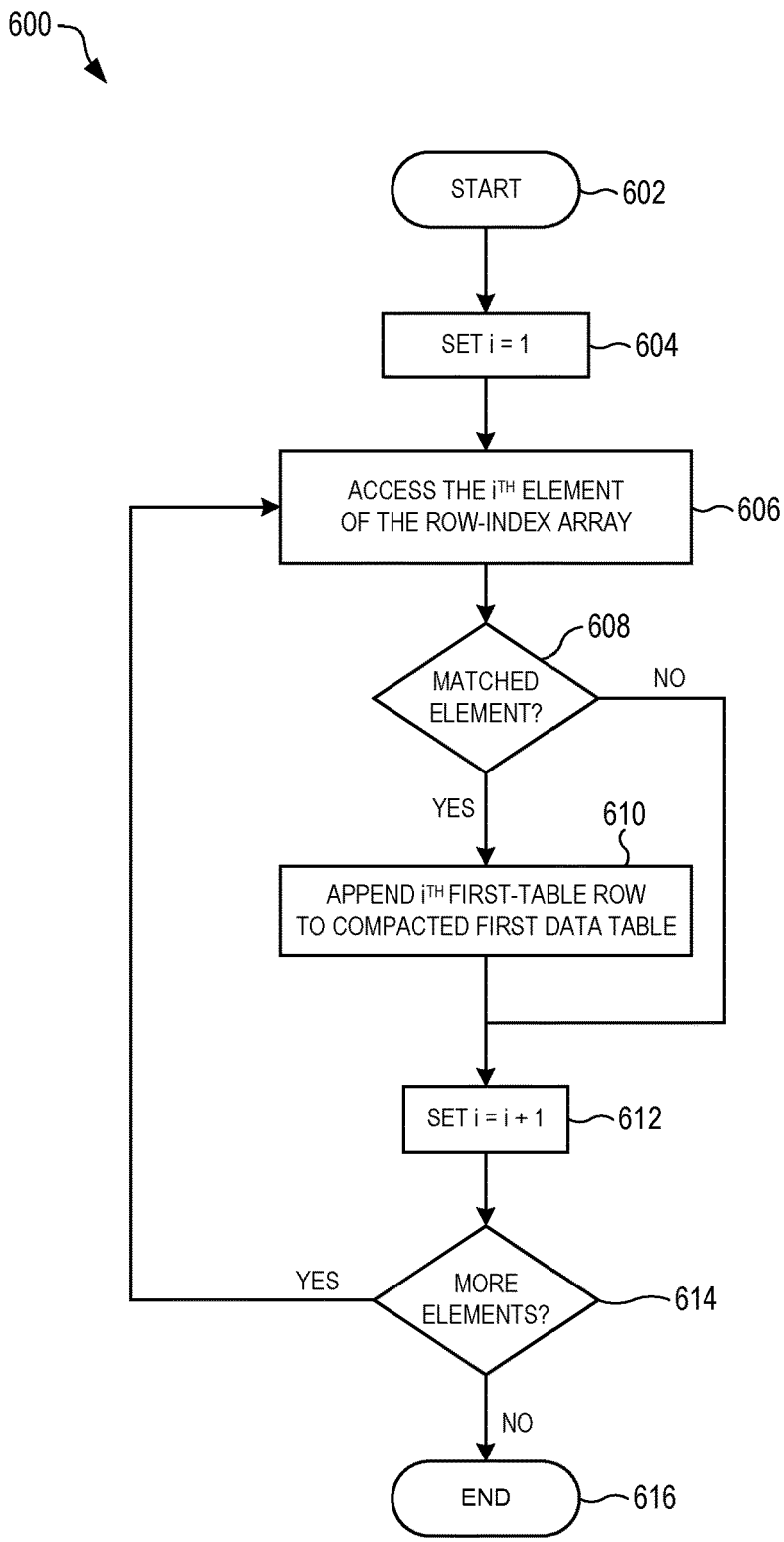
FIG. 6 is a flow chart illustrating a method for compacting, using a row-index array, a first data table into a compacted first data table, in embodiments.

FIG. 6 is a flow chart illustrating a method 600 for compacting, using a row-index array, a first data table into a compacted first data table having a plurality of compacted first-table rows equal to a plurality of matched first-table rows identified for a first data table. In embodiments, the row-index array was previously constructed using method 400 of FIG. 4. As shown in FIG. 5, method 600 may be used to compact first data table 100, using row-index array 300, into compacted first data table 500. As shown in FIG. 6, method 600 may be implemented as a loop with an index variable i that iterates sequentially over n elements of the row-index array, each element corresponding to one of n first-table row positions.

Method 600 starts at a step 602. Method 600 includes a step 604 to set the index variable i to 1, corresponding to the first element of the row-index array. Method 600 includes a step 606 to access the $i^{th}$ element of the row-index array. A decision step 608 determines if the accessed $i^{th}$ element is a matched element. If the decision step 608 returns YES, method 600 continues with a step 610 to append the $i^{th}$ first-table row to the compacted first data table, the $i^{th}$ first-table row being a matched first-table row. After step 610, or if decision step 608 returns NO, method 600 continues with a step 612 to increase the index variable i by one. A decision step 614 determines if there are more elements in the row-index array to be processed. For example, decision step 614 may compare the value of i, as updated in step 612, to the number of elements n of the row-index array. If decision step 614 returns YES, (e.g., i≤n), method 600 returns to step 606 to repeat steps 606-614 with the updated value of i. If decision step 614 returns NO (e.g., i>n), method 600 ends at a step 616.

In an embodiment, a method for compacting, using a row-index array, a first data table into a compacted first data table includes a first step of accessing each element of the row-index array. In one example of the first step, step 606 of method 600 is iteratively executed once for each element of the row-index array. The method also includes a second step of appending, when said each element is one of a plurality of matched elements of the row-index array, a corresponding matched first-table row of the first data table to the compacted first data table. Step 610 of method 600 is one example of the second step of appending.

Figure 7:
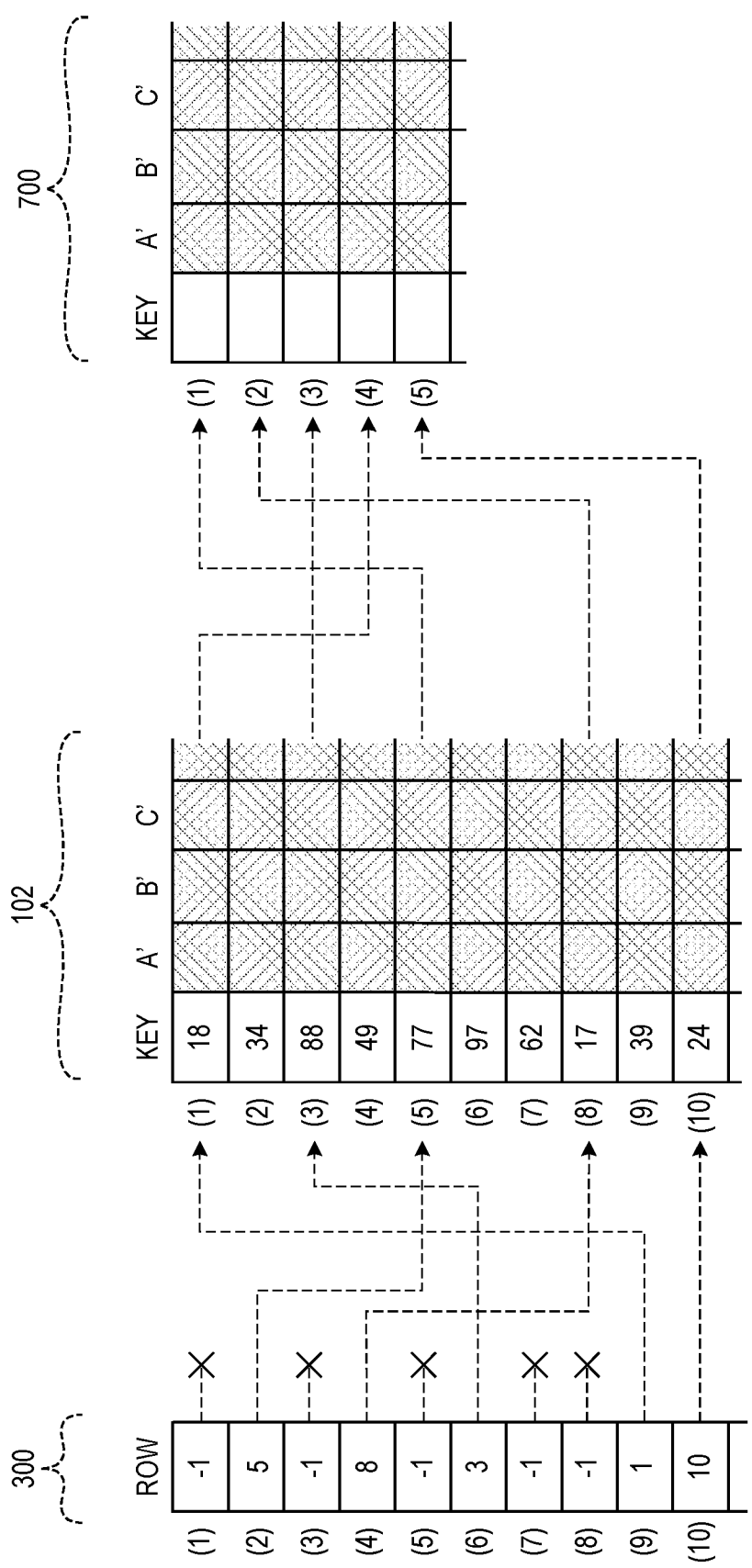
FIG. 7 shows the row-index array of FIG. 3 being used to reorder the second big data table of FIG. 2 into a reordered second data table, in an embodiment.

FIG. 7 shows row-index array 300 being used to reorder second data table 102 into a reordered second data table 700. For each unmatched element of row-index array 300 containing a null value, the unmatched element is skipped or ignored. For each matched element of row-index array 300 not containing the null value, the matched element stores the second-table row position of a matched second-table row. The second-table row at the second-table row position may be appended to reordered second data table 700. In the example of FIG. 7, element 1 of row-index array 300 contains the null value, and is therefore ignored. Element 2 of row-index array 300 contains a non-null value of 5, indicating that second-table row 5 matches first-table row 2. Second-table row 5 may be appended to reordered second data table 700 by copying or moving second-table row 5 to row 1 of reordered second data table 700.

FIG. 7 thus demonstrates a method for reordering a second data table into a reordered second data table. The second data table has a plurality of indexable second-table rows identifiable by a corresponding plurality of unique second-table keys. The method includes a first step of retaining a plurality of matched second-table rows of the second data table, each matched second-table row having a second-table key equal to a first-table key of one matched first-table row of a first data table. The method also includes a second step of discarding a remaining plurality of unmatched second-table rows. The method also includes a third step of reordering the matched second-table rows to equal an order of the corresponding matched first-table rows.

Figure 8:
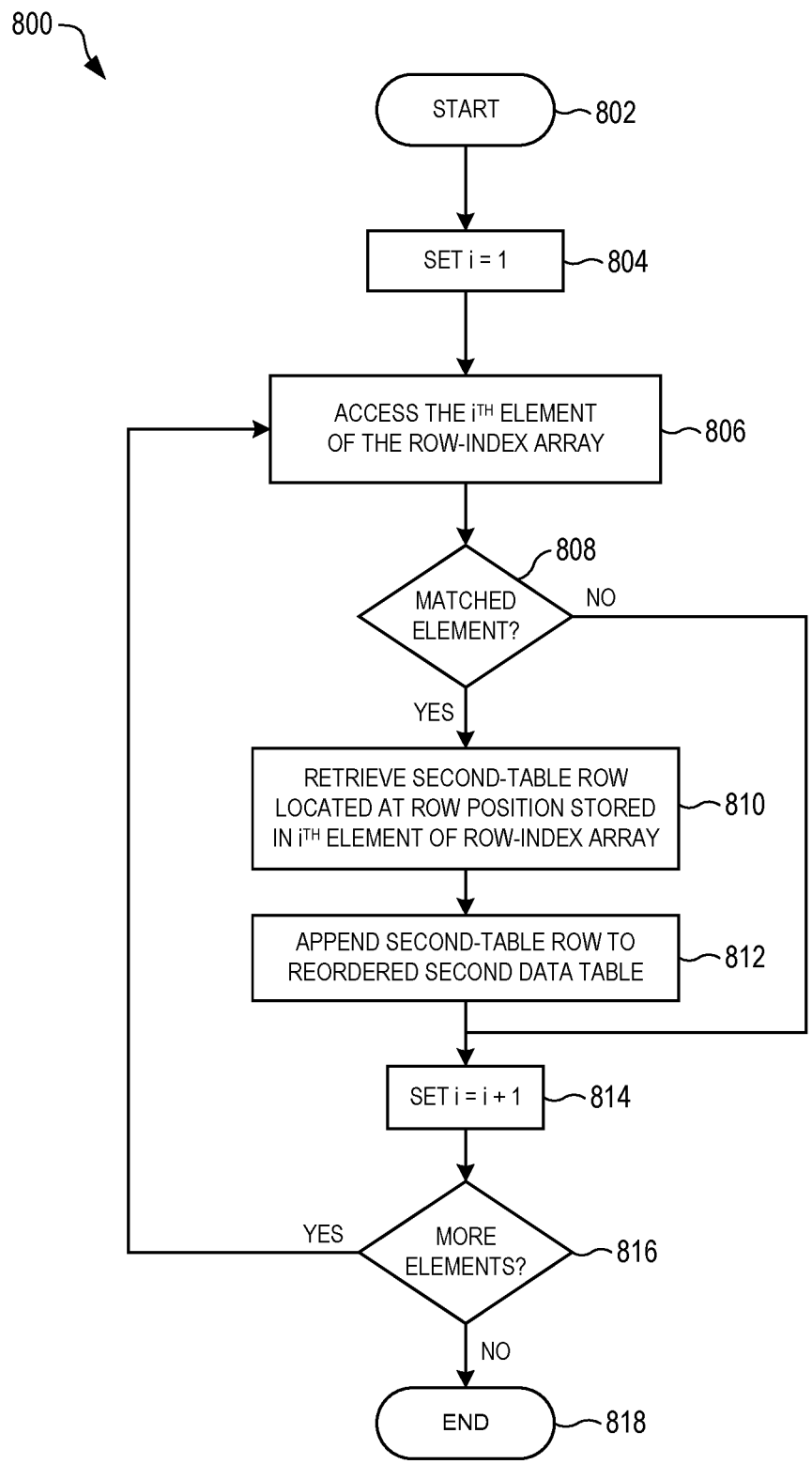
FIG. 8 is a flow chart illustrating a method for reordering, using a row-index array, a second data table into a reordered first data table, in embodiments.

FIG. 8 is a flow chart illustrating a method 800 for reordering, using a row-index array, a second data table into a reordered first data table having a plurality of reordered second-table rows equal to a plurality of matched second-table rows identified for a second data table. In embodiments, the row-index array was previously constructed using method 400 of FIG. 4. As shown in FIG. 7, method 800 may be used to reorder second data table 102, using row-index array 300, into reordered second data table 700. As shown in FIG. 8, method 800 may be implemented as a loop with an index variable i that iterates sequentially over n elements of the row-index array, each element corresponding to one of n first-table row positions.

Method 800 starts at a step 802. Method 800 includes a step 804 to set the index variable i to 1, corresponding to the first element of the row-index array. Method 800 includes a step 806 to access the $i^{th}$ element of the row-index array. A decision step 808 determines if the accessed $i^{th}$ element is a matched element. If the decision step 808 returns YES, method 800 continues to a step 810 to retrieve from the second data table the matched second-table row located at the second-table row position stored in the accessed $i^{th}$ element. Method 800 then continues with a step 812 to append the matched second-table row retrieved in step 810 to the reordered second data table. After step 812, or if decision step 808 returns NO, method 800 continues with a step 814 to increase the index variable i by one. A decision step 816 determines if there are more elements in the row-index array to be processed. For example, decision step 816 may compare the value of i, as updated in step 814, to the number of elements n of the row-index array. If decision step 816 returns YES, (e.g., i≤n), method 800 returns to step 806 to repeat steps 806-816 with the updated value of i. If decision step 816 returns NO (e.g., i>n), method 800 ends at a step 818.

In an embodiment, a method for reordering, using a row-index array, a second data table into a reordered second data table includes a first step of accessing each element of the row-index array. In one example of the first step, step 806 of method 800 is iteratively executed once for each element of the row-index array. The method also includes a second step of appending, when said each element is one of a plurality of matched elements of the row-index array, to the reordered second data table a matched second-table row located at a second-table row position stored in said each element of the row-index array. Steps 810 and 812 of method 800 are one example of the second step of appending.

Figure 9:
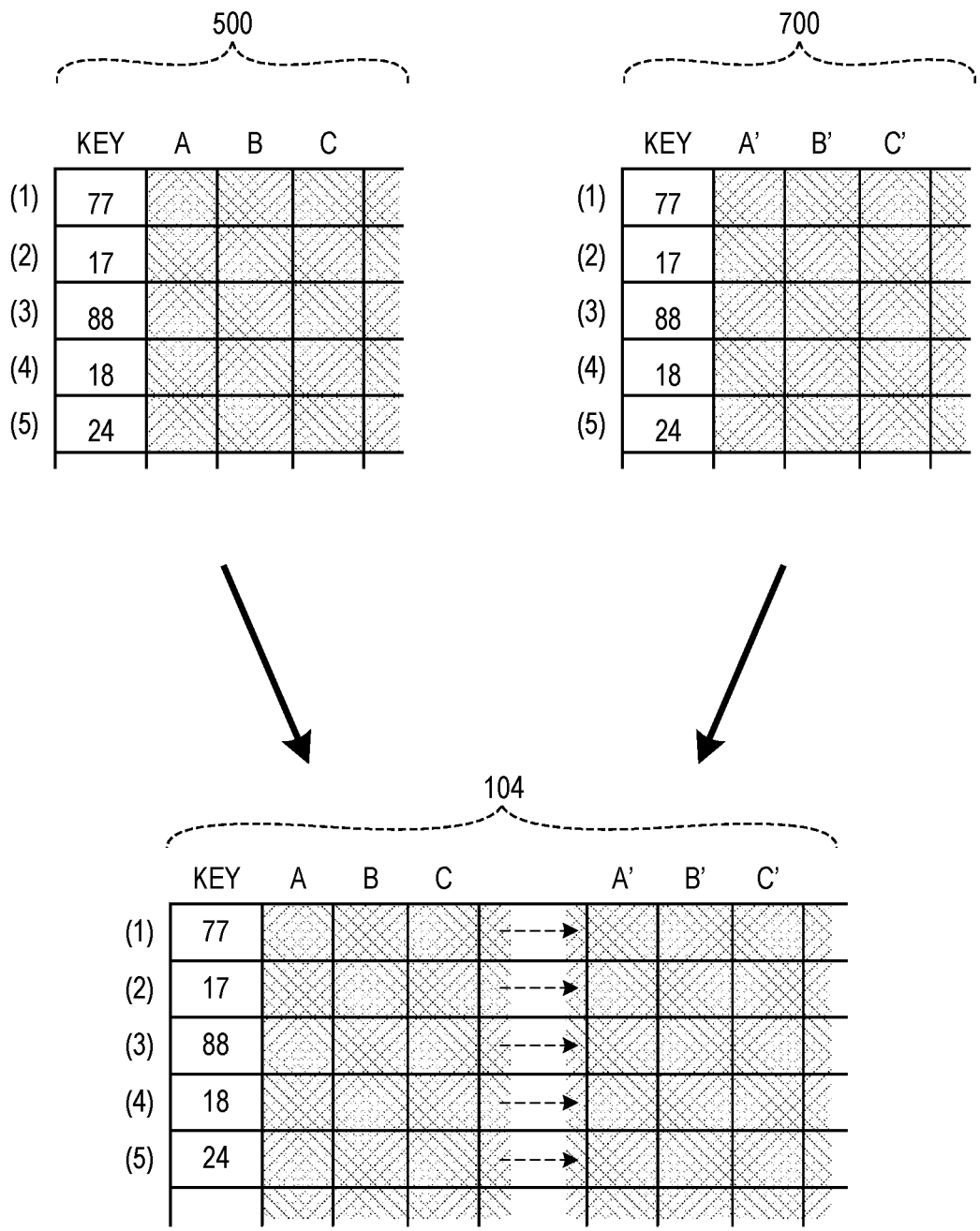
FIG. 9 shows the compacted first data table of FIG. 5 and the reordered second data table of FIG. 7 being efficiently joined into the join table of FIG. 1, in an embodiment.

FIG. 9 shows compacted first data table 500 and reordered second data table 700 being efficiently joined into join table 104. Join table 104 may be formed by sequentially accessing each row of compacted first data table 500, concatenating the row with the same row of reordered second data table 700 into a concatenated row, and appending the concatenated row to join table 104. Since compacted first data table 500 and reordered second data table 700 are aligned, no matching of keys is required for joining. To prevent a key from appearing twice in one concatenated row, the key may be removed from the row of reordered second table 700 prior to concatenation.

Figure 10:
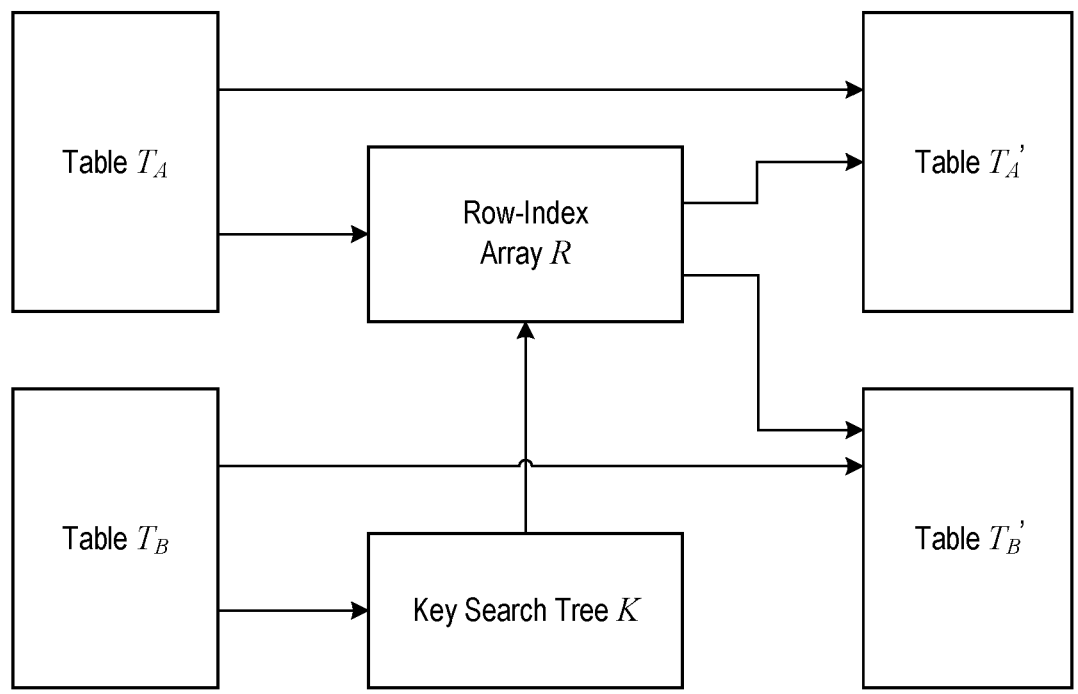
FIG. 10 is a functional diagram showing relationships between data structures for aligning two big data tables, in embodiments.

FIG. 10 is a functional diagram 1000 showing relationships between data structures for aligning two big data tables. For clarity, the tables being aligned in FIG. 10 are labeled $T_A$ and $T_B$. First data table 100 of FIG. 1 is one example of table $T_A$, and second data table 102 of FIG. 1 is one example of table $T_B$. To align $T_A$ and $T_B$, table $T_A$ may be compacted into a table $T_A'$, and table $T_B$ may be reordered into table $T_B'$. To align $T_A$ and $T_B$, key search tree K and row-index array R may be used. Key search tree 200 of FIG. 2 is one example of key search tree K, and row-index array 300 of FIG. 3 is one example row-index array R. As shown in FIG. 10, key search tree K may be first created with table $T_B$. Next, row-index array R may be constructed with key search tree K and table $T_A$. Row-index array R may then be used to align table $T_A$ by compacting table $T_A$ into table $T_A'$, and to align table $T_B$ by reordering table $T_B$ into table $T_B'$.

Figure 11:
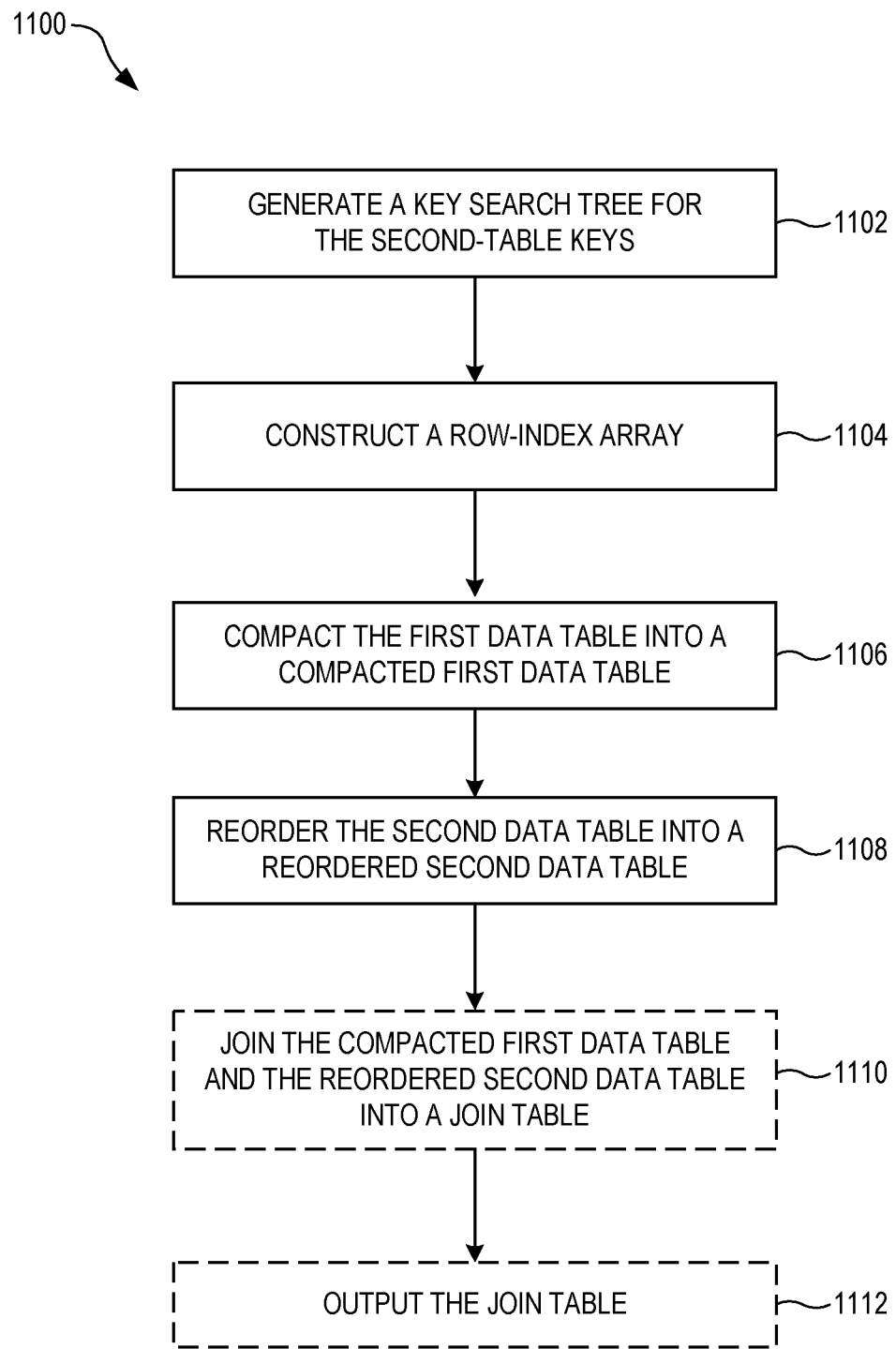
FIG. 11 is a flow chart illustrating a method for aligning first and second big data tables, in embodiments.

FIG. 11 is a flow chart illustrating a method 1100 for aligning first and second big data tables. The first data table has a plurality of indexable first-table rows identifiable by a corresponding plurality of unique first-table keys, and the second data table has a plurality of indexable second-table rows identifiable by a corresponding plurality of unique second-table keys. Advantageously, a time complexity of the method scales linearly with a number of the first-table rows.

Method 1100 includes a step 1102 to generate a key search tree for the second-table keys. In one example of step 1102, key search tree 200 of FIG. 2 is generated for second big data table 102. In another example of step 1102, another type of tree may be generated, such as a B-tree, red-black tree, self-balancing tree, etc.

Method 1100 also includes a step 1104 to construct, using the key search tree of step 1102, a row-index array that is indexed identically to the first-table rows and includes a plurality of matched elements corresponding to a plurality of matched first-table rows, each of the matched elements storing a second-table row position that locates in the second data table a matched second-table row having the second-table key that equals the first-table key of the corresponding matched first-table row. FIG. 3 illustrates one example of step 1104. Method 400 of FIG. 4 illustrates another example of step 1104.

Method 1100 also includes a step 1106 to compact, using the row-index array, the first data table into a compacted first data table having a plurality of compacted first-table rows that equal the matched first-table rows. FIG. 5 illustrates one example of step 1106. Method 600 of FIG. 6 illustrates another example of step 1106.

Method 1100 also includes a step 1108 to reorder, using the row-index array, the second data table into a reordered second data table having a plurality of reordered second-table rows that equal the matched second-table rows, the reordered second-table rows being ordered so that the first-table key of each compacted first-table row equals the second-table key of the corresponding reordered second-table row. FIG. 7 illustrates one example of step 1108. Method 800 of FIG. 8 illustrates another example of step 1108. In one embodiment, step 1108 occurs prior to step 1106. In another embodiment, steps 1106 and 1108 occur simultaneously.

In one embodiment, method 1100 includes a step 1110 to join the compacted first data table and the reordered second data table into a join table. FIG. 9 shows one example of step 1110, wherein compacted first data table 500 and reordered second data 700 are joined into join table 104. In another embodiment, method 1100 includes a step 1112 to output the join table. In one example of step 1112, the join table is outputted to data storage (e.g., see secondary storage 1608 in FIG. 16) where it can be subsequently retrieved for additional analysis. In another embodiment, step 1110 is excluded from method 1100, wherein step 1112 outputs the compacted first data table and the reordered second data table 700 as separate data tables.

In an embodiment, each of first data table 100, second data table 102, compacted first data table 500, and reordered second data table 700 is implemented as a static array, each element of the static array corresponding to one row of the corresponding table. Advantageously, a data table implemented as a static array may be stored contiguously in memory, speeding up access to the memory via locality of reference. Each data table may also be implemented as a dynamic array, linked list, or another data structure without departing from the scope hereof. Row-index array 300 may also be implemented as a static array, dynamic array, linked list, or another data structure.

Aligning More Than Two Data Tables

Figure 12:
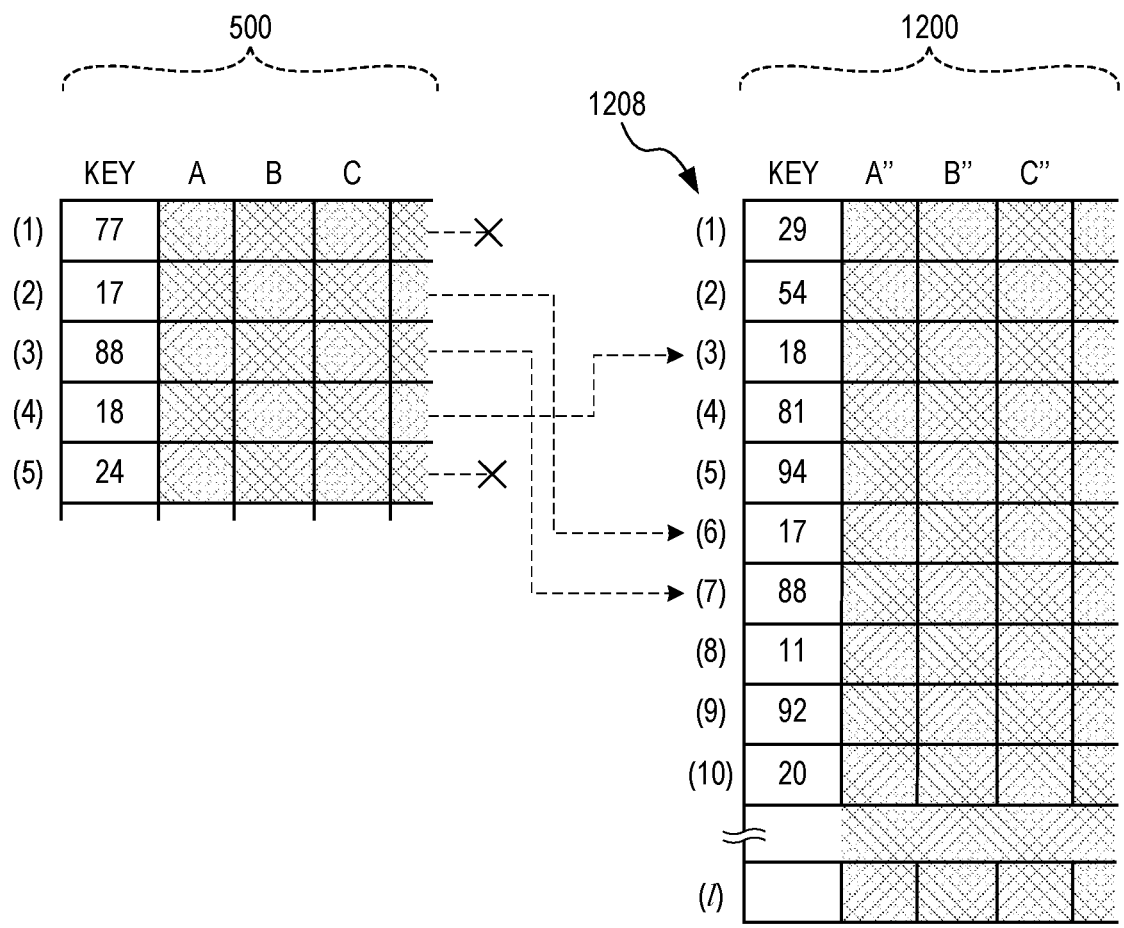
FIG. 12 shows a third big data table being aligned with the compacted first data table of FIG. 5 to align the first big data table of FIG. 1, the second big data table of FIG. 1, and the third big data table, in embodiments.

FIG. 12 shows a third big data table 1200 being aligned with compacted first data table 500 to align first, second, and third big data tables 100, 102, and 1200. Third big data table 1200 has a plurality of l third-table rows and a plurality of columns. A plurality of third-table row positions 1208 indexes the third-table rows with integer values between 1 and l, thereby establishing an order of the third-table rows. For clarity, only the first ten rows and first three data columns (labeled A", B", and C") of third data table 1200 are shown in FIG. 12. Each row of third data table 1200 also has an identifying third-table key stored in a corresponding KEY column. The third-table keys are unique in that no key appears more than once in third data table 1200.

Third data table 1200 is shown in FIG. 12 adjacent to compacted first data table 500. As indicated by the dashed arrows, some rows of compacted first data table 500 and third data table 1200 are matched rows. Specifically, rows 2, 3, and 4 of compacted first data table 500 (having keys 17, 88, and 18, respectively) match third-table rows 6, 7, and 3, respectively. Since rows 2, 3, and 4 are matched first-table rows, reordered second data table 700 contains corresponding matched second-table rows that also match third-table rows 6, 7, and 3, respectively. Rows 2, 3, and 4 of compacted first data table 500 are examples of twice-matched first-table rows, and the corresponding rows 2, 3, and 4 of reordered second data table 700 are examples of twice-matched second-table rows. All other rows of compacted first data table 500, reordered second data table 700, and third data table 1200 are unmatched rows.

Figure 13:
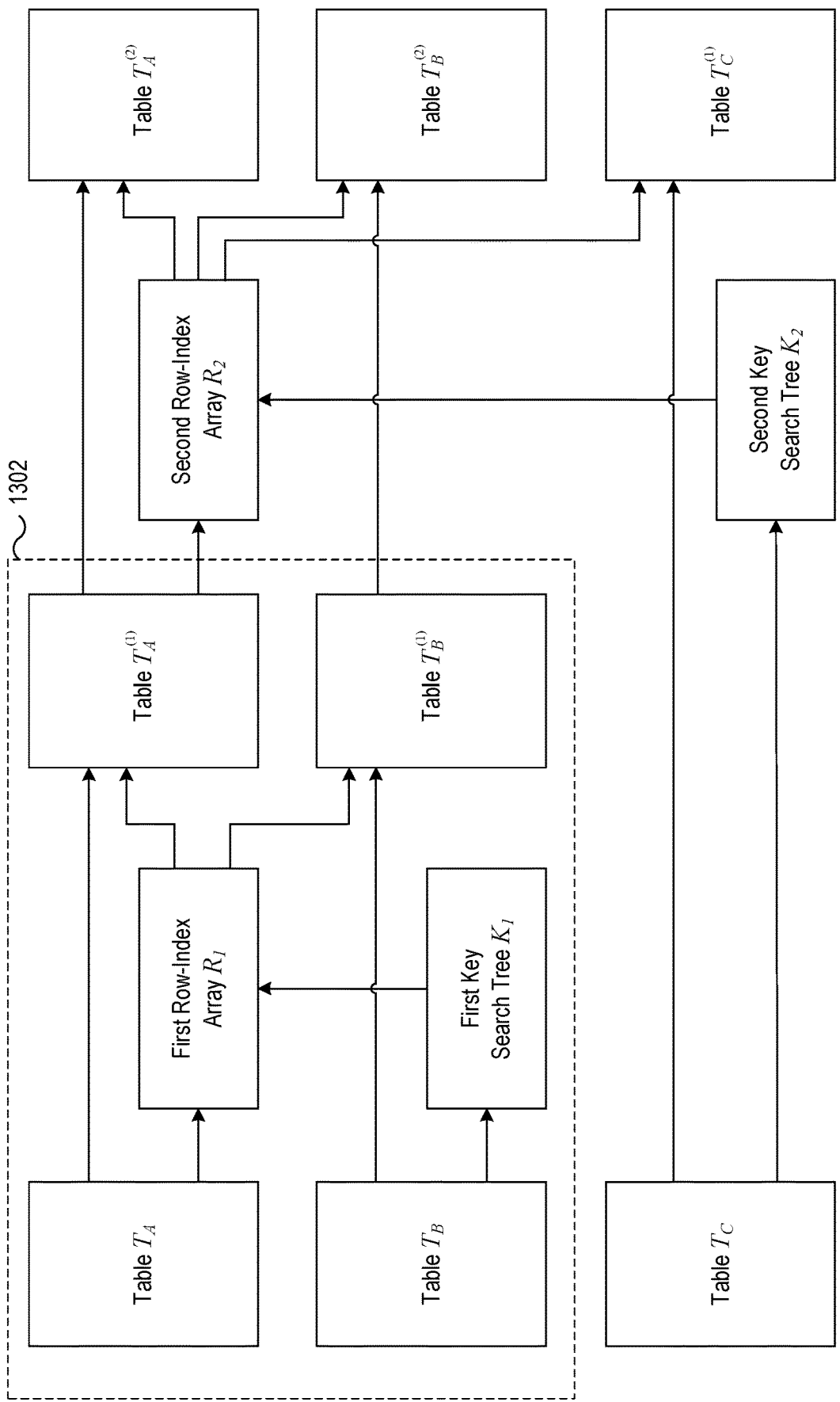
FIG. 13 is a functional diagram showing relationships between data structures for aligning three data tables, in embodiments.

FIG. 13 is a functional diagram showing relationships between data structures for aligning three data tables $T_A$, $T_B$, and $T_C$ (e.g., first, second, and third data tables 100, 102, and 1200). Advantageously, data tables $T_A$, $T_B$, and $T_C$ may be aligned by combining methods described hereinabove for two data tables. First, tables $T_A$ and $T_B$ may be aligned, as indicated by dashed box 1302, which is equivalent to functional diagram 1000 of FIG. 10. In dashed box 1302, a first key search tree $K_1$ is created for table $T_B$ and used with table $T_A$ to generate a first row-index array $R_1$. First row-index array $R_1$ may then be used to compact table $T_A$ into a compacted table $T_A^{(1)}$, and to (reorder table $T_B$ into a reordered table $T_B^{(1)}$, where the superscript indicates the number of times a table has been compacted and/or reordered. Next, a second key search tree $K_2$ may be generated for table $T_C$ and used with compacted table $T_A^{(1)}$ to construct a second row-index array $R_2$. Since compacted table $T_A^{(1)}$ and reordered table $T_B^{(1)}$ are aligned, the second row-index array $R_2$ may be alternatively constructed from reordered table $T_B^{(1)}$. In either case, second row-index array $R_2$ may be used to compact compacted table $T_A^{(1)}$ into a twice-compacted table $T_A^{(2)}$, compact reordered table $T_B^{(1)}$ into a compacted-reordered table $T_B^{(2)}$, and reorder table $T_C$ into a reordered table $T_C^{(1)}$. Tables $T_A^{(2)}$, $T_B^{(2)}$, and $T_C^{(1)}$ are aligned, i.e., each row of twice-compacted table $T_A^{(2)}$ has a key that matches the key of the corresponding row of compacted-reordered table $T_B^{(2)}$, and that matches the key of the corresponding row of reordered table $T_C^{(1)}$. With aligned tables $T_A^{(2)}$, $T_B^{(2)}$, and $T_C^{(1)}$, all measurements for a data point may be obtained by concatenating the same row of the aligned tables, greatly speeding up data retrieval.

Figure 14:
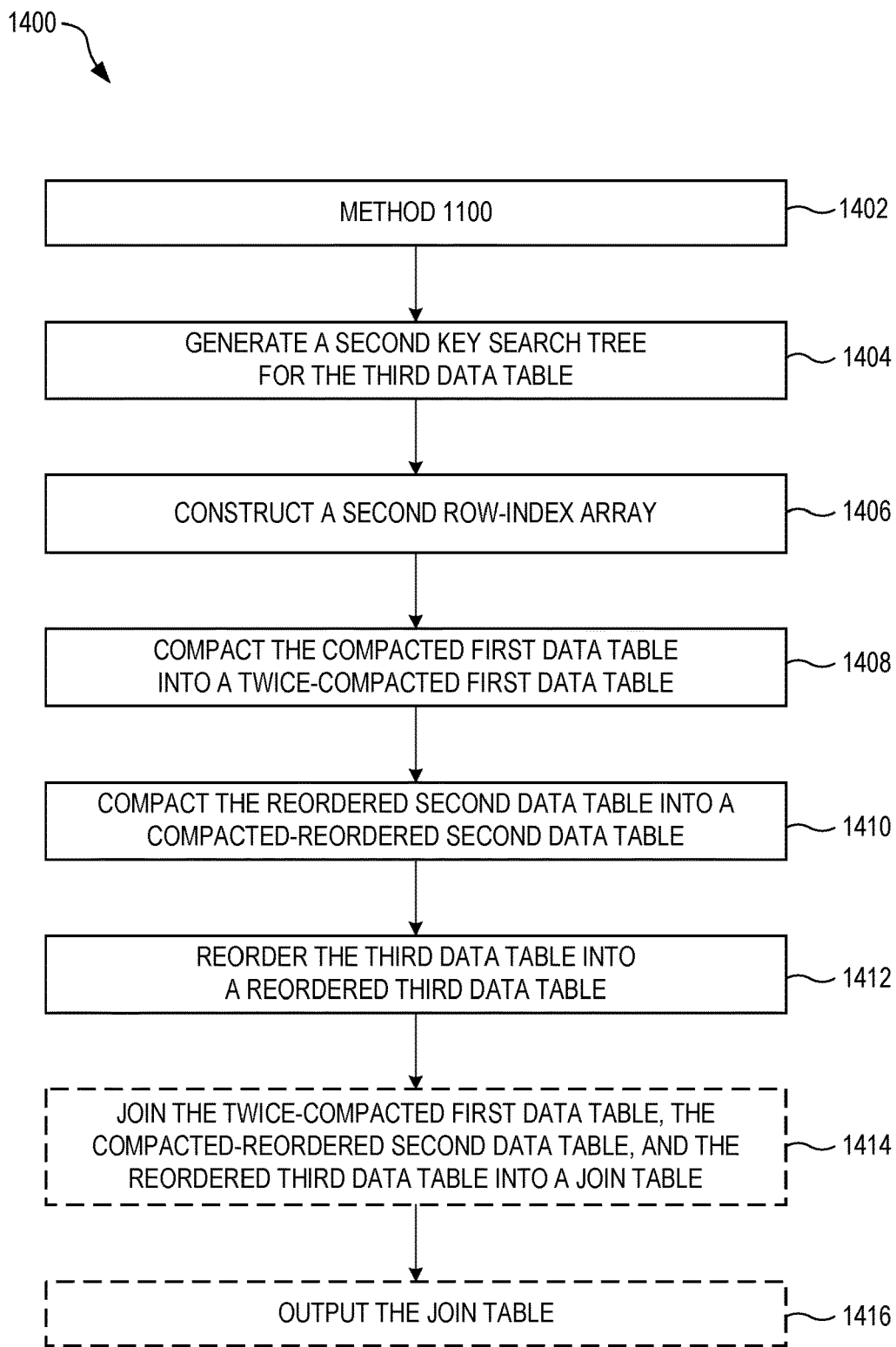
FIG. 14 is a flow chart illustrating a method for aligning first, second, and third data tables, in embodiments.

FIG. 14 is a flow chart illustrating a method 1400 for aligning first, second, and third data tables. Method 1400 includes a step 1402 to perform method 1100 of FIG. 11 to compact the first data table into a compacted first data table having a plurality of compacted first-table rows that equal matched first-table rows of the first data table. Step 1402 also reorders the second data table into a reordered second data table having a plurality of reordered second-table rows that equal matched second-table rows of the second data table. Method 1400 also includes a step 1404 to generate a second key search tree for a third data table having a plurality of indexable third-table rows identifiable by a corresponding plurality of unique third-table keys.

Method 1400 also includes a step 1406 to construct, using the second key search tree, a second row-index array that is indexed identically to the compacted first-table rows and includes a plurality of twice-matched elements corresponding to a plurality of twice-matched first-table rows. Each of the twice-matched elements stores a third-table row position that locates in the third data table a matched third-table row having the third-table key that equals the first-table key of the corresponding twice-matched first-table row. Method 400 of FIG. 4 is one example of step 1406. Since the compacted first data table and reordered second data table are aligned prior to step 1406, the third-table key also equals the second-table key of a corresponding twice-matched second-table row of the reordered second data table. Similarly, the second row-index array will be indexed identically to the reordered second-table rows when indexed identically to the compacted first-table rows.

Method 1400 also includes a step 1408 to compact, using the second row-index array, the compacted first data table into a twice-compacted first data table having a plurality of twice-compacted rows that equal the twice-matched first-table rows. Method 600 of FIG. 6 is one example of step 1410. Method 1400 also includes a step 1410 to compact, using the second row-index array, the reordered second data table into a compacted-reordered second data table having a plurality of compacted-reordered rows that equal a plurality of twice-matched second-table rows of the reordered second table rows. Method 600 of FIG. 6 is one example of each of steps 1408 and 1410.

Method 1400 also includes a step 1412 to reorder, using the second row-index array, the third data table into a reordered third data table having a plurality of reordered third-table rows that equal the matched third-table rows. Method 800 of FIG. 8 is one example of step 1412. While FIG. 11 shows step 1408 occurring before step 1410, and step 1410 occurring before step 1412, steps 1408, 1410, and 1412 may occur in any order without departing from the scope hereof. In one embodiment, steps 1408, 1410, and 1412 occur simultaneously.

In one embodiment, method 1400 includes a step 1414 to join the twice-compacted first data table, the compacted-reordered second data table, and the reordered third data table into a join table. In another embodiment, method 1400 includes a step 1416 to output the join table. In one example of step 1416, the join table is outputted to data storage (e.g., see secondary storage 1608 in FIG. 16) where it can be subsequently retrieved for additional analysis. In another embodiment, step 1414 is excluded from method 1400, wherein step 1416 outputs the twice-compacted first data table, the compacted-reordered second data table, and the reordered third data table as separate data tables.

In an embodiment, each data table (e.g., tables $T_A$, $T_B$, $T_C$, $T_A^{(1)}$, $T_B^{(2)}$, $T_A^{(2)}$, $T_B^{(2)}$, and $T_C^{(1)}$ of FIG. 13) is implemented as a static array, each element of the static array corresponding to one row of the corresponding table. Advantageously, a data table implemented as a static array may be stored contiguously in memory, speeding up access to the memory via locality of reference. Each data table may also be implemented as a dynamic array, linked list, or another data structure without departing from the scope hereof. Similarly, each of the first and second row-index arrays (e.g., row-index arrays $R_1$ and $R_2$ of FIG. 13) may be implemented as a static array, dynamic array, linked list, or another data structure.

FIG. 15 shows construction of a row-index table 1500 for aligning first, second, and third big data tables 100, 102, and 1200 by compacting and/or reordering each of first, second, and third big data tables 100, 102, and 1200 only once. Advantageously, by compacting and/or reordering each big data table only once, compacted first data table 500 and reordered second data table 700 are not necessary, thereby increasing speed and reducing memory usage, such as operationally described in FIG. 16.

Row-index table 1500 has three columns labeled 1, 2, and 3 and a plurality of indexing rows. Row-index table 1500 has a number of rows n equal to the number of first-table rows of first data table 100. For clarity, only the first ten indexing rows of row-index table 1500 are individually shown. A plurality of index-table positions 1508 indexes the indexing rows with integer values between 1 and n, thereby establishing an order of the indexing rows that equals the order of the first-table rows.

In FIG. 15, row-index table 1500 is shown at three different points during its construction. First, the first-table keys of first data table 100 are stored in column 1 of row-index table 1500 in the same order as they are stored in first data table 100 (e.g., according to first-table row positions 106), as illustrated by row-index table 1500(1). Second, a key search tree 200 is used with the first-table keys in column 1 of row-index table 1500 to generate row-index array 300, which is stored in column 2 of row-index table 1500. When the null value appears in column 2 of an indexing row, the null value may also be inserted to column 1 of the indexing row, as illustrated by row-index table 1500(2).

Finally, a second key search tree for third data table 1200 is used with the first-table keys in column 1 to construct a second row-index array that is stored in column 3 of row-index table 1500. To construct the second row-index array, the indexing rows may be accessed sequentially according to index-table positions 1508. When an indexing row contains the null value in the column 1, the null value may be copied to column 3 of the indexing row without searching the second key search tree. When the indexing row does not contain the null value, the second key search tree is searched for the first-table key stored in column 1 of the indexing row. If the first-table key is not found in the second key search tree, the null value is inserted into columns 1, 2, and 3 of the indexing row. Note that first data table 100 is not accessed when constructing the second row-index array, as the needed first-table keys are already stored in column 1 of row-index table 1500.

Column 1 of row-index table 1500 may be used to compact first data table 100 directly into a twice-compacted first data table (e.g., table $T_A^{(2)}$ of FIG. 13) without intermediate compacted first data table 500. Column 2 of row-index table 1500 may be used to reorder and compact second data table 102 directly into a compacted-reordered second data table (e.g., table $T_B^{(2)}$ of FIG. 13) without intermediate reordered second data table 700. Column 3 of row-index table 1500 may be used to reorder third data table 1200 into a reordered third data table (e.g., table $T_C^{(1)}$ of FIG. 11).

Row-index table 1500 may also be used to directly generate a join table without generating any intermediate compacted and/or reordered tables. For example, indexing row 4 is the first indexing row having a valid key in column 1. A first concatenated row may be formed by concatenating KEY 17, first-table row 4, second-table row 8, and third-table row 6. The first concatenated row may be appended to the join table by copying or moving the first concatenated to row 1 of the join table. The same process may be repeated for indexing rows 6 and 9, generating respective second and third concatenated rows for assigning as rows 2 and 3, respectively, of the join table.

Embodiments described hereinabove to align three big data tables may be extended to align more than three big data tables. For example, to align N big data tables $T_1, T_2, \ldots, T_N$, row-index table 1500 may be created with N columns, one for each big data table. First-table keys from table $T_1$ may be stored in column 1 of row-index table 1500 in the same order as they are stored in table $T_1$. For each table $T_2, \ldots, T_i, \ldots T_N$, a corresponding column i of row-index table 1500 may be filled by creating a key search tree for table $T_i$ and using the key search tree to search for each valid (i.e., not containing the null value) first-table key in column 1. When all the columns of row-index table 1500 are filled, each column i of row-index table 1500 may be used to compact and/or reorder the corresponding table $T_i$ into a fully-aligned table in one step without creating any compacted and/or reordered tables. The N tables may then be readily joined into a join table by concatenating the same row of each of the N tables into one concatenated row, and appending the one concatenated row to the join table.

Time Complexity

This section describes in more detail how the four steps of (1) generating a key-search tree, (2) constructing a row-index array from a second data table (e.g., step 1102 of method 1100), (3) compacting a first big data table into a compacted first data table (e.g., step 1104 of method 1100), and (4) reordering a second big data table into a reordered second data table (e.g., step 1106 of method 1100) advantageously combine to align the first and second big data tables with a scaling that is at most linear with the number n of first-table rows. This linear scaling extends to aligning of more than two data tables, as described above in reference to FIGS. 13-15.

Generating the key search tree with m nodes has a time complexity of $O(m \log_2 m)$, which is greater than linear in m. However, generating the key search tree is significantly faster than the compacting and reordering because it does not require the time- and memory-intensive movement of rows between, or within, tables. Thus, this greater-than-linear scaling does not dominate the overall scaling of the four steps when considered together as a whole.

As shown in method 400 of FIG. 4, constructing the row-index array sequentially accesses the n first-table rows, and for each row first-table row searches the key search tree (see step 408 of method 400). When the key search tree is a fully-constructed binary search tree having m nodes, searching for a node of the key search tree has an average time complexity of $O(\log_2 m)$ when the tree is balanced, and a time complexity of $O(m)$ when the tree is completely unbalanced (i.e., a singly-linked list). Assuming the key search tree is balanced, the average time complexity for constructing the row-index array is $O(n \log_2 m)$, which is greater than linear in n. However, constructing the row-index array is also significantly faster than compacting and reordering because it also does not require the time- and memory-intensive movement of rows between, or within, tables. Thus, this greater-than-linear scaling does not dominate the overall scaling of the four steps when considered together as a whole.

As shown in method 600 of FIG. 6, compacting the first data table sequentially accesses the first-table rows and, simultaneously, the elements of the row-index array. Therefore, this step has a time complexity no greater than $O(n)$. As shown in method 800 of FIG. 6, reordering the second data table also sequentially accesses the elements of the row-index array, and directly accesses matched second-table rows. Therefore, the step of reordering has a time complexity no greater than $O(n)$. The time complexity of compacting and reordering equals $O(n)$ when all first-table rows and second-table rows are matching rows.

Equivalently, the time complexity for generating the key search tree may scale may be expressed as a first time complexity $O_1(\alpha\, m \log_2 m)$ for a constant $\alpha$. Similarly, the time complexity for constructing the row-index array may be expressed as a second time complexity $O_2((n \log_2 m)$ for a constant $\beta$, the time complexity for compacting the first data table may be expressed as a third time complexity $O_3(\gamma\, n)$ for a constant $\gamma$, and the time complexity for reordering the second data table may be expressed as a fourth time complexity $O_4(\delta\, n)$ for a constant $\delta$. The overall time complexity $O_T$ for the four steps, considered together, is given by $$O_T \approx O_1(\alpha\, m\, \log_2 m) + O_2(\beta n\, \log_2 m) + O_3(\gamma + O_4(\delta n)). \tag{1}$$

However, because the steps of generating and constructing do not require the movement of rows between or within tables, while the steps of compacting and reordering do require such movement, $\alpha$ and $\beta$ are both much less than $\gamma$ and $\delta$. Thus, when n and/or m are small enough, $O_1$ and $O_2$ are negligible and $O_T \approx O_3(\gamma\, n) + O_4(\delta\, n)$, which is linear in n. Thus, the term "linear" used herein means predominantly linear to the extent that O1 and O2 are negligible compared to $O_3$ and $O_4$ from Eqn. 1.

If n and/or m are large enough, then $O_1$ and $O_2$ cannot be ignored. However, in practice, the values of n and m where this occurs are so large, even by big-data standards, that memory management becomes a limiting computational bottleneck, and Eqn. 1 is no longer valid.

As shown in FIG. 9, joining a compacted first data table and a reordered second data table (e.g., step 1110 of method 1100) sequentially accesses the rows of the compacted first data table and, simultaneously, the rows of the reordered second data table. Therefore, the step of joining scales with the number of rows of the compacted first data table, which is no greater than n. Therefore, joining has a time complexity no greater than O (n). This linear scaling extends to the joining of more than two data tables, as described above in reference to FIGS. 13-15.

Implementations

Figure 16:
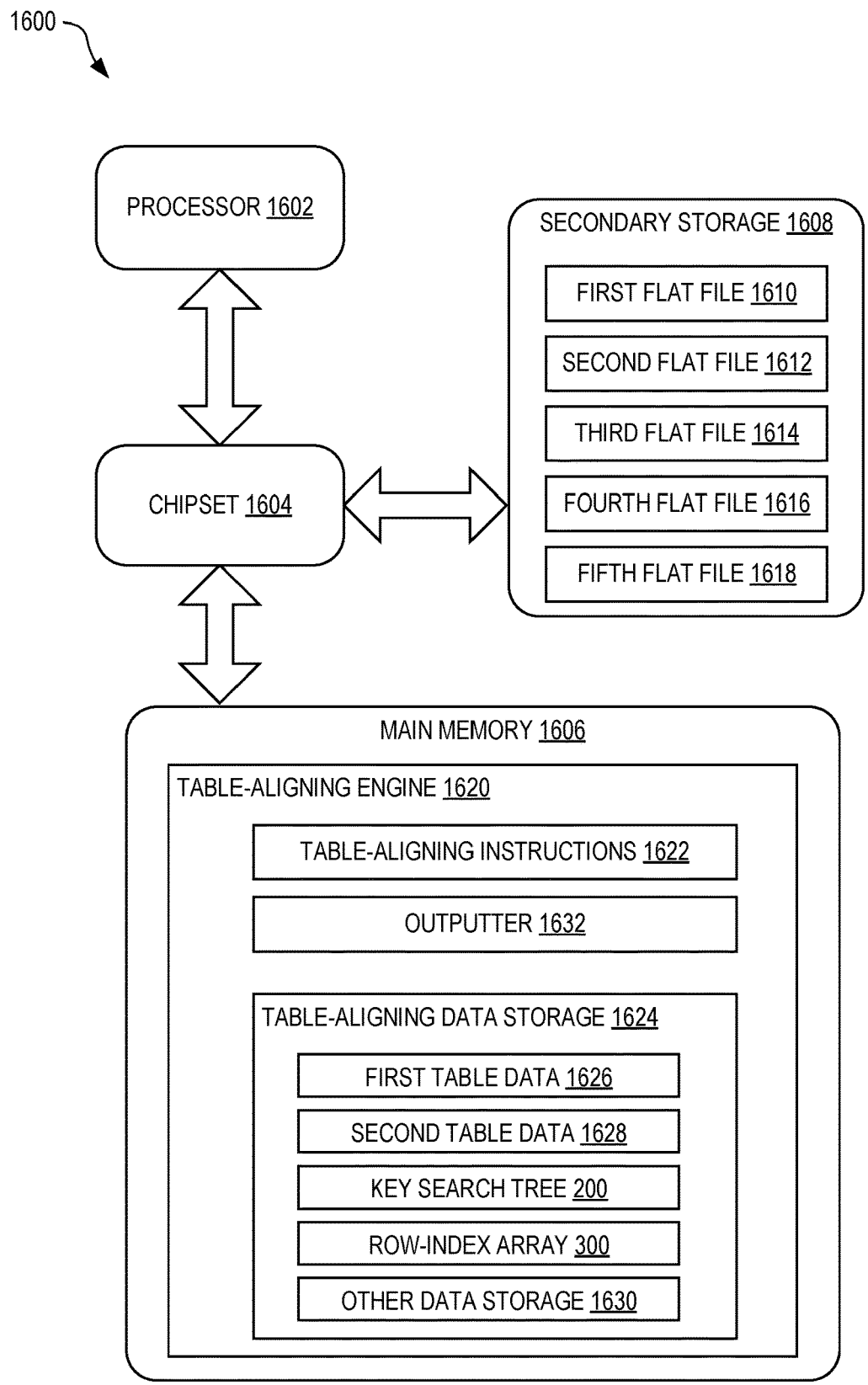
FIG. 16 shows one example of a computing system on which embodiments described herein may be implemented.

FIG. 16 shows one example of a computing device 1600 on which embodiments described herein may be implemented. Computing device 1600 includes a processor 1602, a chipset 1604, a main memory 1606, and a secondary storage 1608. Main memory 1606 is faster and has a smaller capacity than secondary storage 1608. For example, main memory 1606 may be RAM located proximate to processor 1602, and secondary storage 1608 may be a hard disk drive or solid-state drive. Other forms of main memory 1606 and/or secondary storage 1608 may be used without departing from the scope hereof.

Secondary storage 1608 stores first and second big data tables 100, 102 as first and second flat files 1610, 1612, respectively. Secondary storage 1608 also stores compacted first data table 500 and reordered second data table 700 as third and fourth flat files 1614, 1616, respectively. When compacted first data table 500 and reordered second data table 700 are joined into join table 104, secondary storage 1608 may store join table 104 as a fifth flat file 1618. Although not shown in FIG. 16, secondary storage 1608 may store other big data tables, compacted data tables, and/or reordered data tables as additional flat files when computing device 1600 contains instructions to align more than two big data tables (e.g., according to method 1400). Secondary storage 1608 may also store key search trees, row-index arrays, and/or row-index tables as files.

Processor 1602 may include one or more cores, cache memory, a memory management unit, and other components for assisting with the execution of machine-readable instructions. Chipset 1604 manages data flow between processor 1602, main memory 1606, and secondary storage 1608, and may be a single chip or multiple chips (e.g., northbridge and southbridge chips). Chipset 1604 may also be integrated onto the same chip as processor 1602, wherein processor 1602 connects directly to main memory 1606 and secondary storage 1608.

Main memory 1606 stores machine-readable instructions to be executed by processor 1602, and data needed by processor 1602 for executing the machine-readable instructions. In the example of FIG. 16, main memory 1606 is shown storing a table-aligning engine 1620 having machine-readable table-aligning instructions 1622 then, when executed by processor 1602, control computing device 1600 to align first and second big data tables 100 and 102, as stored in first and second flat files 1610, 1612, respectively. Table-aligning engine 1620 also includes table-aligning data storage 1624 that stores a portion of first flat file 1610 as first table data 1626, and a portion of second flat file 1612 as second table data 1628. Table-aligning data storage 1624 also stores key search tree 200, row-index array 300, and other data in other data storage 1630, as needed by processor 1602 to execute table-aligning instructions 1622. Each of first big data table 100, second big data table 102, compacted first data table 500, and reordered second data table 700 may be stored entirely in main memory 1606, depending upon the size of the tables and the storage capacity of main memory 1606. Alternatively, a portion of each of first big data table 100, second big data table 102, compacted first table 500, and reordered second table 700 may be stored in main memory 1606.

In one embodiment, table-aligning instructions 1622, when executed by processor 1602, control computing device 1600 to align first and second data tables 100, 102 stored as first and second flat files 1610, 1612, respectively, in secondary storage 1608. First data table 100 has a plurality of indexable first-table rows identifiable by a corresponding plurality of unique first-table keys, and second data table 102 has a plurality of indexable second-table rows identifiable by a corresponding plurality of unique second-table keys. Table-aligning instructions 1622 control computing device 1600 to generate key search tree 200 for the second-table keys, and to construct row-index array 300 using key search tree 200. Row-index array 300 is indexed identically to the first-table rows and includes a plurality of matched elements corresponding to a plurality of matched first-table rows. Each of the matched elements stores a second-table row position that locates in second data table 102 a matched second-table row having the second-table key that equals the first-table key of the corresponding matched first-table row. Table-aligning instructions 1622 also control computing device 1600 to compact, using row-index array 300, first data table 100 into compacted first data table 500 having a plurality of compacted first-table rows that equal the matched first-table rows. Table-aligning instructions 1622 also control computing device 1600 to reorder, using row-index array 300, second data table 102 into reordered second data table 700 having a plurality of reordered second-table rows that equal the matched second-table rows. The reordered second-table rows are ordered so that the first-table key of each compacted first-table row equals the second-table key of the corresponding reordered second-table row. In one example of this embodiment, table-aligning instructions 1622 implement steps 1102, 1104, 1106, and 1108 of method 1100. In another example, table-aligning instructions 1622 implement method 400, method 600, and/or method 800.

In an embodiment, table-aligning instructions 1622 further control computing device 1600 to join compacted first data table 500 and reordered second data table 700 into join table 104, thereby implementing step 1110 of method 1100. In another embodiment, table-aligning engine 1620 includes an outputter 1632 implemented as machine-readable instructions that, when executed by processor 1602, control computing device 1600 to output one or more of compacted first data table 500, reordered second data table 700, and join table 104. For example, outputter 1632 may control computing device 1600 to output compacted first data table 500 to secondary storage 1608 for storage as third flat file 1614. In another example, outputter 1632 controls computing device 1600 to output join table 102 to secondary storage 1608 for storage as fifth flat file 1618.

In another embodiment, table-aligning instructions 1422, when executed by processor 1602, further control computing device 1600 to generate a second key search tree (e.g., second key search tree $K_2$ of FIG. 13) for a third data table (e.g., table $T_C$ of FIG. 13) having a plurality of indexable third-table rows identifiable by a corresponding plurality of unique third-table keys. Table-aligning instructions 1622 also control computing device 1600 to construct, using the second key search tree, a second row-index array (second row-index array $R_2$ of FIG. 13) that is indexed identically to the compacted first-table rows and includes a plurality of twice-matched elements corresponding to a plurality of twice-matched first-table rows. Each of the twice-matched elements stores a third-table row position that locates in the third data table a matched third-table row having the third-table key that equals the first-table key of the corresponding twice-matched first-table row. Table-aligning instructions 1622 also control computing device 1600 to compact, using the second row-index array, compacted first data table 700 into a twice-compacted first data table (e.g., table $T_A^{(2)}$ of FIG. 13) having a plurality of twice-compacted rows that equal the twice-matched first-table rows. Table-aligning instructions 1622 also control computing device 1600 to compact, using the second row-index array, reordered second data table 700 into a compacted-reordered second data table (e.g., table $T_B^{(2)}$ of FIG. 13) having a plurality of compacted-reordered rows that equal a plurality of twice-matched second-table rows of the reordered second table rows. Table-aligning instructions 1622 also control computing device 1600 to reorder, using the second row-index array, the third data table into a reordered third data table (e.g., table $T_C^{(1)}$ of FIG. 13) having a plurality of reordered third-table rows that equal the matched third-table rows. In one example of this embodiment, table-aligning instructions 1622 implement steps 1402, 1404, 1406, 1408, 1410, and 1412 of method 1400.

In an embodiment, table-aligning instructions 1622 further control computing device 1600 to join the twice-compacted first data table, the compacted-reordered second data table, and the reordered third data table into a join table, thereby implementing step 1414 of method 1400. In another embodiment, outputter 1632 controls computing device 1600 to output one or more of the twice-compacted first data table, the compacted-reordered second data table, the reordered third data table, and the join table. For example, outputter 1632 may control computing device 1600 to output the join table to secondary storage 1608 for storage as fifth flat file 1618.

Memory Management

Memory management techniques known in the art may be used with the embodiments presented herein when at least one data table is too large to fit within main memory 1606. In some embodiments, each big data table described hereinbefore, when too large to fit in main memory 1606, may be stored on, and accessed from, secondary storage 1608 as a memory-mapped file. For example, each of first and second flat files 1610 and 1612, storing respective first and second big data tables 100 and 102, may be memory-mapped by the operating system to appear as a contiguous part of an address space of a corresponding process executing table-aligning instructions 1622. The process may access each memory-mapped file using virtual addresses, similarly to how other memory in the address space may be accessed. When the process requests data from a memory-mapped file, the operating system and hardware cooperate to retrieve the data from disk, store the data in first and/or second table data 1626, 1628, and free the corresponding main memory 1606 when the process no longer needs the data. In an embodiment, each flat file is stored contiguously on secondary storage 1608 according to respective row positions of the corresponding table stored within. For example, first big data table 100 may be stored in first flat file 1610 such that the rows of first big data table 100 are stored contiguously according to row positions 106.

In one embodiment, memory-mapping is implemented with paging, wherein data from the memory-mapped file is swapped into and out of main memory 1606 as pages having a page size. Translation lookaside buffers (TLBs), segmentation, page tables and other memory management techniques known in the art may be used by the operating system and/or hardware to implement paging.

In some embodiments, the page size is smaller than a storage size of a row of a data table. A page size meeting this condition is described herein as a "small" page size. For example, when each row of first big data table 100 contains 10,240 measurements, each measurement represented by a 32-bit single-precision floating point number, the row storage size is 40 KiB. In one embodiment, the page size is 4 KiB, corresponding to ten page frames per row for a row storage size of 40 KiB. However, a page size may be larger or smaller than 4 KiB without departing from the scope herein. In embodiments, the page size is chosen based on the plurality of row storage sizes of the data tables to be aligned. For example, the page size may be chosen to be smaller than the smallest of the row storage sizes of the data tables.

In other embodiments, the page size is larger than the row storage size. A page size meeting this condition is described herein as a "large" page size. In one embodiment, the page size is 4 MiB, in which case each page may store up to 100 rows when the row storage size is 40 KiB. However, the page size may be larger or smaller than 4 MiB without departing from the scope herein. In an embodiment, the page size is chosen to be the largest of the row storage sizes of the data tables.

A small page size may advantageously result in faster generation of key search trees (e.g., step 1102 of method 1100) and row-index arrays (e.g., step 1104 of method 1100), compared to a large page size, by reducing the amount of data to be swapped from disk into main memory 1606. Swapping performs fetching of data from disk (e.g., secondary storage 1608), which is orders of magnitude slower that accessing RAM (e.g., main memory 1606). Therefore, any technique or approach that minimizes the amount of data read from and/or written to disk may have a substantial impact on execution speed of table-aligning instructions 1622.

As an example of how a small page size reduces the amount of data to be swapped from secondary storage 1608, constructing key search tree 200 only requires the second-table keys and second-table row positions 108 of second data table 102. While a key may only take up a few bytes of memory, the page size sets a lower limit of how much data may be swapped from secondary storage 1608. Therefore, to access the key of a row, only the one page storing the key needs to be swapped, saving time and reducing memory usage by not swapping the pages forming the rest of the row. As another example, constructing row-index array 300 only requires the keys of first data table 100. Therefore, to access the key of a row, only the one page storing the key is needed, saving time and RAM by not swapping the pages containing the rest of the row.

When constructing a key search tree and/or a row-index array, row data (e.g., measurements) swapped with the key in the one page is not needed, leading to internal fragmentation. To reduce internal fragmentation, a smaller page size may be selected, in turn improving speed and reducing memory usage. However, a small page size may disadvantageously slow down paging by increasing the size of page tables, TLBs, and other data structures used for paging and memory mapping. In one embodiment, a small page size is chosen by considering the effect of page size on paging speed and overhead memory utilization.

A large page size may advantageously speed up compacting and reordering of a data table (e.g., steps 1106 and 1108 of method 1100), compared to a small page size, by reducing the number of page swaps to and from secondary storage 1608, thereby saving some of the overhead incurred from page swaps (e.g., reducing a number of TLB misses, page faults, and replacements). Compacting and reordering data tables differ from constructing key search trees and row-index arrays in that all the data in each row may be used (e.g., when the row is a matched row). In one embodiment, a first data table (e.g., first big data table 100) is compacted by copying matched rows of the first big data table into a compacted first data table (e.g., compacted first data table 500) stored separately from the first data table, advantageously preserving the first data table in its original form for future reuse. The compacted first data table may be stored contiguously on disk as a flat file (e.g., third flat file 1614), according to its row positions, and accessed via memory mapping. In another embodiment, a second data table (e.g., second big data table 102) is reordered by copying matched rows of the second big data table into a reordered second table (e.g., reordered second data table 700) stored separately from the second big data table, advantageously preserving the second data table in its original form for future reuse. The reordered second data table may be stored contiguously on disk as a flat file (e.g., fourth flat file 1616), according to its row positions, and accessed via memory mapping.

A large page size may also advantageously speed up compacting by utilizing spatial locality. When the page size is sized to store multiple consecutive rows, sequential accessing of the rows in a page will result in a series of TLB hits. These hits continue until the first row in the next page is requested, at which point the previous page may be replaced with the next page.

One disadvantage of a large page size is that unmatched rows will be swapped as part of each page. For example, when each page is sized to store multiple rows, several of the rows in the page may be unmatched; these rows may be ignored, and therefore swapping of these rows into main memory 1606 wastes time and memory. In one embodiment, a page size comparable to the row storage size is selected, wherein each matched row corresponds to one page; this embodiment advantageously minimizes swapping of unmatched rows into main memory 1606 by ensuring that a swapped page contains only a matched row.

A similar disadvantage of a large page size occurs during reordering, where the rows of the second big data table are requested in random order, as opposed to sequential order. When each page of the second data table stores multiple consecutive rows, a first page may be swapped into main memory 1606 to access a first row in the first page. However, there is little probability that the first page also stores the second row to be requested. In this case, a request for the second row will generate a page fault that causes a second page, having the second row, to be swapped from secondary storage 1608 into main memory 1606. Randomly accessing the rows of the second data table and swapping corresponding pages into main memory 1606 may continue until all main memory 1606 is used, at which point a page already in main memory 1606 may be replaced with a different page from secondary storage 1608. At certain times, a row of the second data table that is already in main memory 1606 is requested, resulting in a page hit. However, when the second data table is too large to be stored entirely in main memory 1606, a swapped page in main memory 1606 may need to be replaced before all its matched rows are copied into the reordered second table. In this case, the page will need to be swapped out of secondary storage 1608 a second time, further slowing down the reordering.

In one embodiment, multiple page sizes are selected. For example, a small page size may be selected for generating key search trees and constructing row-index arrays, and a larger page size may be selected for compacting and reordering. In one embodiment, table-aligning instructions 1622 are executed as separate first and second processes. The first process runs with a first page size, wherein processor 1602 constructs at least one key search tree and/or at least one row-index array as part of the first process. The second process runs with a second page size, wherein processor 1602 compacts and reorders first and second big data tables as part of the second process. In this embodiment, each of first and second flat files 1610 and 1612 may be implemented as a memory-mapped file that is shared between the first and second processes, appearing within each process as memory addressable according to the address space of the process. In another embodiment, processor 1602 only compacts first big data table 100 during the second process, wherein first flat file 1610 is shared between the first and second processes, and a third process runs with a third page size, wherein processor 1602 reorders second big data table 102, and second flat file 1612 is shared between the first and third processes.

Distributed Computing Environments

In one embodiment, secondary storage 1608 is located remotely from the other components of computing device 1600 (i.e., processor 1602, chipset 1604, and main memory 1606). For example, secondary storage 1608 may form part of a computing device that is connected, via a network, to computing device 1600, wherein data to/from the flat files stored on secondary storage 1608 may be transferred over the network to computing device 1600. In another embodiment, the flat files are stored on multiple secondary storages across multiple computing devices, each networked to computing device 1600.

In one embodiment, methods described herein are implemented on a distributed computing system, wherein multiple processors, each with its own main memory, work cooperatively to align N big data tables. Generation of key search trees is one step that may benefit from a distributed computing architecture. Specifically, to align N data tables, N−1 key search trees may be generated simultaneously with the multiple processors, thereby reducing the time needed to generate the N−1 key search trees. In another embodiment, after row-index table 1500 is constructed, the N big data tables are aligned (e.g., compacted and/or reordered using the corresponding column of row-index lookup table 1500) simultaneously with the multiple processors.

In one embodiment, the distributed computing system includes a plurality of N networked computing devices, each with a processor, main memory, and secondary storage. A first computing device stores the first big data table to be aligned, and for each of the remaining N−1 secondary computing devices, the secondary storage stores one flat file corresponding to one big data table to be aligned. Each secondary computing device generates a key search tree for its corresponding big data table, and transfers the key search tree to the first computing device. The first computing device copies the keys of the first big data table into the first column of a row-index lookup table, and uses the N−1 received key search trees to fill the remaining N−1 columns of row-index table 1500. The first computing device then sends to each secondary computing device the corresponding column of row-index lookup table 1500. All N computing devices may then simultaneously compact and/or reorder their respective big data table into an aligned data table.

To join the aligned data tables into a single join table, each computing device only transfers its aligned data table once. For example, each secondary computing device may transfer its aligned table to the first computing device, which receives the N−1 aligned tables and joins them, with the first aligned table, into a join table. When an aligned table is smaller than the corresponding big data table from which it was formed, this embodiment advantageously results in less data being transferred across the network, compared to transferring the larger big data tables.

In some embodiments, flat files containing big data tables are stored in a cloud computing architecture. For example, a user may upload the flat files to a storage device forming part of a cloud. The cloud provider may then implement methods described herein using the cloud's resources and infrastructure, making available to the user aligned versions of the uploaded flat files and/or a corresponding join table. The user may then access the cloud to retrieve the aligned flat files and/or join table.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for aligning first and second data tables, wherein:
the first data table comprises a first array, the first array comprising a plurality of first-table rows, each first-table row of the plurality of first-table rows (i) storing a first-table key, of a plurality of first-table keys, that uniquely identifies said each first-table row in the first array and (ii) having a first-table row position that uniquely locates said each first-table row in the first array, the first-table key being different from the first-table row position;
the second data table comprises a second array, the second array comprising a plurality of second-table rows, each second-table row of the plurality of second-table rows (i) storing a second-table key, of a plurality of second-table keys, that uniquely identifies said each second-table row in the second array and (ii) having a second-table row position that uniquely locates said each second-table row in the second array, the second-table key being different from the second-table row position;
the first array has a first subset of matched first-table rows and the second array has a second subset of matched second-table rows, the first-table key of each matched first-table row of the first subset equaling the second-table key of a corresponding matched second-table row of the second subset;
the first array has a third subset of unmatched first-table rows, the first-table key of each unmatched first-table row of the third subset not equaling any of the plurality of second-table keys; and
the second array has a fourth subset of unmatched second-table rows, the second-table key of each unmatched second-table row of the fourth subset not equaling any of the plurality of first-table keys;
the method comprising:
generating a key search tree having a plurality of nodes, each of the plurality of nodes storing (i) one of the plurality of second-table keys and (ii) the second-table row position of the one of the plurality of second-table rows having said one of the plurality of second-table keys;
constructing, using the key search tree, a row-index array comprising a plurality of row-index elements that are indexed in one-to-one correspondence with the plurality of first-table rows of the first array, the row-index array including a plurality of matched elements of the plurality of row-index elements, each matched element of the plurality of matched elements storing the second-table row position of the matched second-table row whose corresponding matched first-table row is located at the first-table row position that matches an element position of said each matched element in the row-index array;
compacting, using the row-index array, the first data table into a compacted first data table by discarding the unmatched first-table rows from the first data table;
reordering, using the row-index array, the second data table into a reordered second data table by:
discarding the unmatched second-table rows from the second data table; and
rearranging the matched second-table rows such that an order of the second-table keys of the matched second-table rows is similar to matches an order of the first-table keys of the matched first-table rows; and
joining the compacted first data table and the reordered second data table.

2. The method of claim 1, wherein said joining includes:
accessing each matched first-table row of the compacted first data table and the corresponding matched second-table row of the reordered second data table;
concatenating said each matched first-table row with the corresponding matched second-table row to create a concatenated row; and
appending the concatenated row to a join table.

3. The method of claim 1, wherein said compacting the first data table includes maintaining the order of the first-table keys of the matched first-table rows.

4. The method of claim 1, wherein said constructing the row-index array includes iteratively:
searching the key search tree for the first-table key of each first-table row;
when the first-table key of said each first-table row is found in one of the plurality of nodes of the key search tree:
inserting, into the one of the plurality of row-index elements of the row-index array located at the first-table row position of said each first-table row, the second-table row position stored in said one of the plurality of nodes; and
when the first-table key of said each first-table row is not found in the key search tree,
inserting a null value into the one of the plurality of row-index elements of the row-index array located at the first-table row position of said each first-table row.

5. The method of claim 4, wherein said compacting the first data table includes iteratively:
accessing each row-index element of the plurality of row-index elements of the row-index array, said each row-index element having a row-index position that uniquely locates said each row-index element in the row-index array; and
appending to the compacted first data table, when said each row-index element is not the null value, the matched first-table row located in the first data table at the row-index position of said each row-index element.

6. The method of claim 4, wherein said reordering the second data table includes iteratively:
accessing each row-index element of the plurality of row-index elements of the row-index array; and
appending to the reordered second data table, when said each row-index element is not the null value, the matched second-table row located in the second data table at the second-table row position stored in said each row-index element.

7. The method of claim 1, further comprising aligning a third data table with the compacted first data table and the reordered second data table;
wherein:
the third data table comprises a third array, the third array comprising a plurality of third-table rows, each third-table row of the plurality of third-table rows (i) storing a third-table key, of a plurality of third-table keys, that uniquely identifies said each third-table row in the third array and (ii) having a third-table row position that uniquely locates said each third-table row in the third array;
the third array has a fifth subset of matched third-table rows, the compacted first data table has a sixth subset of twice-matched first-table rows, the reordered second data table has a seventh subset of twice-matched second-table rows, the third-table key of each matched third-table row of the fifth subset equaling both (i) the first-table key of a corresponding twice-matched first-table row of the sixth subset and (ii) the second-table key of a corresponding twice-matched second-table row of the seventh subset;
the compacted first data table has an eighth subset of unmatched-matched first-table rows, the first-table key of each unmatched-matched first table row of the eighth subset not equaling any of the plurality of third-table keys;
the reordered second data table has a ninth subset of unmatched-matched second-table rows, the second-table key of each unmatched-matched second-table row of the ninth subset not equaling any of the plurality of third-table keys; and
the third data table has a tenth subset of unmatched third-table rows, the third-table key of each unmatched third-table row of the tenth subset not equaling any of the first-table keys of the compacted first data table;
said aligning the third data table comprising:
generating a second key search tree for the plurality of third-table keys;
constructing, using the second key search tree, a second row-index array;
compacting, using the second row-index array, the compacted first data table into a twice-compacted first data table by discarding the unmatched-matched first-table rows of the compacted first data table;
compacting, using the second row-index array, the reordered second data table into a compacted-reordered second data table by discarding the unmatched-matched second-table rows of the reordered second data table;
reordering, using the second row-index array, the third data table into a reordered third data table by:
discarding the unmatched third-table rows from the third data table; and
rearranging the matched third-table rows such that an order of the third-table keys of the matched third-table rows is similar to both an order of the first-table keys of the twice-matched first-table rows and an order of the second-table keys of the twice-matched second-table rows; and
joining the twice-compacted first data table, the compacted-reordered second data table, and the reordered third data table.

8. The method of claim 7, wherein said joining includes:
accessing each twice-matched first-table row of the twice-compacted first data table, the corresponding twice-matched second-table row of the compacted-reordered second data table, and the corresponding matched third-table row of the reordered third data table;
concatenating said each twice-matched first-table row with the corresponding twice-matched second-table row and the corresponding matched third-table row to create a concatenated row; and
appending the concatenated row to a join table.

9. The method of claim 7, wherein:
said compacting the first data table includes maintaining the order of the first-table keys of the matched first-table rows;
said compacting the compacted first data table includes maintaining the order of the first-table keys of the twice-matched first-table rows; and
said compacting the reordered second data table includes maintaining the order of the second-table keys of the twice-matched second-table rows.

10. A system for aligning data tables, comprising:
a secondary storage that stores first and second data tables, wherein:
the first data table comprises a first array, the first array comprising a plurality of first-table rows, each first-table row of the plurality of first-table rows (i) storing a first-table key, of a plurality of first-table keys, that uniquely identifies said each first-table row in the first array and (ii) having a first-table row position that uniquely locates said each first-table row in the first array, the first-table key being different from the first-table row position;
the second data table comprises a second array, the second array comprising a plurality of second-table rows, each second-table row of the plurality of second-table rows (i) storing a second-table key, of a plurality of second-table keys, that uniquely identifies said each second-table row in the second array and (ii) having a second-table row position that uniquely locates said each second-table row in the second array, the second-table key being different from the second-table row position;
the first array has a first subset of matched first-table rows and the second array has a second subset of matched second-table rows, the first-table key of each matched first-table row equaling the second-table key of a corresponding matched second-table row of the second subset;
the first array has a third subset of unmatched first-table rows, the first-table key of each unmatched first-table row of the third subset not equaling any of the plurality of second-table keys; and
the second array has a fourth subset of unmatched second-table rows, the second-table key of each unmatched second-table row of the fourth subset not equaling any of the plurality of first-table keys;
a processor; and
a table-aligning engine, implemented as machine-readable instructions stored in a memory in electronic communication with the processor, that, when executed by the processor, controls the system to:
generate a key search tree having a plurality of nodes, each of the plurality of nodes storing (i) one of the plurality of second-table keys and (ii) the second-table row position of the one of the plurality of second-table rows having said one of the plurality of second-table keys, construct, using the key search tree, a row-index array comprising a plurality of row-index elements that are indexed in one-to-one correspondence with the plurality of first-table rows of the first array, the row-index array including a plurality of matched elements of the plurality of row-index elements, each matched element of the plurality of matched elements storing the second-table row position of the matched second-table row whose corresponding matched first-table row is located at the first-table row position that matches an element position of said each matched element in the row-index array, compact, using the row-index array, the first data table into a compacted first data table by discarding the unmatched first-table rows from the first data table, reorder, using the row-index array, the second data table into a reordered second data table by (i) discarding the unmatched second-table rows from the second data table and (ii) rearranging the matched second-table rows such that an order of the second-table keys of the matched second-table rows matches an order of the first-table keys of the matched first-table rows, and join the compacted first data table and the reordered second data table.

11. The system of claim 10, wherein the machine-readable instructions that, when executed by the processor, control the system to join include machine-readable instructions that, when executed by the processor, control the system to:

access each matched first-table row of the compacted first data table and the corresponding matched second-table row of the reordered second data table, concatenate said each matched first-table row with the corresponding matched second-table row to create a concatenated row, and append the concatenated row to a join table.

12. The system of claim 10, wherein the machine-readable instructions that, when executed by the processor, control the system to compact the first data table include machine-readable instructions that, when executed by the processor, control the system to maintain the order of the first-table keys of the matched first-table rows.

13. The system of claim 10, wherein the machine-readable instructions that, when executed by the processor, control the system to construct the row-index array include machine-readable instructions that, when executed by the processor, control the system to iteratively:

search the key search tree for the first-table key of each first-table row, when the first-table key of said each first-table row is found in one of the plurality of nodes of the key search tree:

insert, into the one of the plurality of row-index elements of the row-index array located at the first-table row position of said each first-table row, the second-table row position stored in said one of the plurality of nodes, and when the first-table key of said each first-table row is not found in the key search tree:

insert a null value into the one of the plurality of row-index elements of the row-index array located at the first-table row position of said each first-table row.

14. The system of claim 13, wherein the machine-readable instructions that, when executed by the processor, control the system to compact the first data table include machine-readable instructions that, when executed by the processor, control the system to iteratively:

access each row-index element of the plurality of row-index elements of the row-index array, said each row-index element having a row-index position that uniquely locates said each row-index element in the row-index array, and append to the compacted first data table, when said each row-index element is not the null value, the matched first-table row located in the first data table at the row-index position of said each row-index element.

15. The system of claim 13, wherein the machine-readable instructions that, when executed by the processor, control the system to reorder the second data table include machine-readable instructions that, when executed by the processor, control the system to iteratively:

access each row-index element of the plurality of row-index elements of the row-index array, and append to the reordered second data table, when said each row-index element is not the null value, the matched second-table row located in the second data table at the second-table row position stored in said each row-index element.

16. The system of claim 10, wherein:

the secondary storage additionally stores a third data table comprising a third array, the third array comprising a plurality of third-table rows, each third-table row of the plurality of third-table rows (i) storing a third-table key, of a plurality of third-table keys, that uniquely identifies said each third-table row in the third array and (ii) having a third-table row position that uniquely locates said each third-table row in the third array;

the third array has a fifth subset of matched third-table rows, the compacted first data table has a sixth subset of twice-matched first-table rows, the reordered second data table has a seventh subset of twice-matched second-table rows, the third-table key of each matched third-table row of the fifth subset equaling both (i) the first-table key of a corresponding twice-matched first-table row of the sixth subset and (ii) the second-table key of a corresponding twice-matched second-table row of the seventh subset;

the compacted first data table has an eighth subset of unmatched-matched first-table rows, the first-table key of each unmatched-matched first-table row of the eighth subset not equaling any of the plurality of third-table keys;

the reordered second data table has a ninth subset of unmatched-matched second-table rows, the second-table key of each unmatched-matched second-table row of the ninth subset not equaling any of the plurality of third-table keys;

the third data table has a tenth subset of unmatched third-table rows, the third-table key of each unmatched third-table row of the tenth subset not equaling any of the first-table keys of the compacted first data table; and the table-aligning engine includes additional machine-readable instructions that, when executed by the processor, control the system to:

generate a second key search tree for the plurality of third-table keys, construct, using the second key search tree, a second row-index array, compact, using the second row-index array, the compacted first data table into a twice-compacted first data table by discarding the unmatched-matched first-table rows of the compacted first data table, compact, using the second row-index array, the reordered second data table into a compacted-reordered second data table by discarding the unmatched-matched second-table rows of the reordered second data table, reorder, using the second row-index array, the third data table into a reordered third data table by (i) discarding the unmatched third-table rows from the third data table and (ii) rearranging the matched third-table rows such that an order of the third-table keys of the matched third-table rows equals both an order of the first-table keys of the twice-matched first-table rows and an order of the second-table keys of the twice-matched second-table rows, and join the twice-compacted first data table, the compacted-reordered second data table, and the reordered third data table.

17. The system of claim 16, wherein the machine-readable instructions that, when executed by the processor, control the system to join include machine-readable instructions that, when executed by the processor, control the system to:

access each twice-matched first-table row of the twice-compacted first data table, the corresponding twice-matched second-table row of the compacted-reordered second data table, and the corresponding matched third-table row of the reordered third data table, concatenate said each twice-matched first-table row with the corresponding twice-matched second-table row and the corresponding matched third-table row to create a concatenated row, and append the concatenated row to a join table.

18. The system of claim 16, wherein:

the machine-readable instructions that, when executed by the processor, control the system to compact the first data table include machine-readable instructions include machine-readable instructions that, when executed by the processor, control the system to maintain the order of the first-table keys of the matched first-table rows;

the machine-readable instructions that, when executed by the processor, control the system to compact the compacted first data table include machine-readable instructions that, when executed by the processor, control the system to maintain the order of the first-table keys of the twice-matched first-table rows; and the machine-readable instructions that, when executed by the processor, control the system to compact the reordered second data table include machine-readable instructions that, when executed by the processor, control the system to maintain the order of the second-table keys of the twice-matched second-table rows.

* * * * *